US011985606B2

(12) United States Patent
Takeda et al.

(10) Patent No.: US 11,985,606 B2
(45) Date of Patent: May 14, 2024

(54) POWER SCALING FOR DYNAMIC POWER AGGREGATION

(71) Applicant: QUALCOMM Incorporated, San Diego, CA (US)

(72) Inventors: Kazuki Takeda, Tokyo (JP); Peter Gaal, San Diego, CA (US); Wanshi Chen, San Diego, CA (US); Alberto Rico Alvarino, San Diego, CA (US); Gokul Sridharan, Sunnyvale, CA (US); Chiranjib Saha, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 380 days.

(21) Appl. No.: 17/556,377

(22) Filed: Dec. 20, 2021

(65) Prior Publication Data
US 2023/0199672 A1 Jun. 22, 2023

(51) Int. Cl.
*H04W 52/28* (2009.01)
*H04W 52/14* (2009.01)
*H04W 52/36* (2009.01)
*H04W 72/23* (2023.01)

(52) U.S. Cl.
CPC ....... *H04W 52/281* (2013.01); *H04W 52/146* (2013.01); *H04W 52/367* (2013.01); *H04W 72/23* (2023.01)

(58) Field of Classification Search
CPC ............ H04W 52/281; H04W 52/146; H04W 52/367; H04W 72/23; H04W 52/225; H04W 52/221; H04W 72/0453; H04L 5/001; H04L 5/0094
See application file for complete search history.

(56) References Cited

U.S. PATENT DOCUMENTS

| 10,447,413 | B1* | 10/2019 | Nadakuduti | .......... | H04B 17/18 |
| 2012/0021800 | A1* | 1/2012 | Wilson | ............... | H04W 72/02 |
| | | | | | 455/127.1 |
| 2012/0270592 | A1* | 10/2012 | Ngai | .................. | H04W 52/226 |
| | | | | | 455/522 |

FOREIGN PATENT DOCUMENTS

WO WO-2021168648 A1 9/2021

OTHER PUBLICATIONS

International Search Report and Written Opinion—PCT/US2022/080351—ISA/EPO—Mar. 31, 2023.

* cited by examiner

*Primary Examiner* — Chae S Lee
(74) *Attorney, Agent, or Firm* — Holland & Hart LLP

(57) ABSTRACT

Methods, systems, and devices for wireless communications are described. A user equipment (UE) may be configured to satisfy an uplink transmission power criterion, such as a specific absorption rate (SAR). The UE may be scheduled to transmit a first uplink message via a first frequency band and a second uplink message via a second frequency band. The UE perform power scaling on the first frequency band and the second frequency band to satisfy the uplink transmission power criterion. For example, the UE may select a first transmission power level for transmitting the first uplink message and a second transmission power level for transmitting the second uplink message based on a function of UE transmission power level over a preceding time interval. The UE may perform uplink power aggregation techniques to temporarily boost transmit power while satisfying the uplink transmission power criterion.

30 Claims, 18 Drawing Sheets

POWER SCALING FOR DYNAMIC POWER AGGREGATION

FIELD OF TECHNOLOGY

The following relates to wireless communications, including power scaling for dynamic power aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power scaling for dynamic power aggregation. Generally, the described techniques provide for a user equipment (UE) to perform power scaling on one or more radio frequency spectrum bands of a carrier aggregation configuration or dual connectivity configuration to satisfy an uplink power criterion, such as a specific absorption rate (SAR). For example, the UE may be scheduled to transmit a first uplink message via a first radio frequency spectrum band and a second uplink message via a second radio frequency spectrum band. The UE may be configured with the uplink transmission power criterion, which may be a SAR-oriented power limit or another transmit power limitation for the UE or a wireless communications system. In some cases, the UE may have separate power amplifier limits for each radio frequency spectrum band, such that a total power amplifier limit exceeds the uplink transmission power criterion. The UE perform power scaling on the first frequency band and the second frequency band to satisfy the uplink transmission power criterion. For example, the UE may perform power scaling or power dropping on the radio frequency spectrum bands in order of priority to satisfy the uplink transmission power criterion. In some other examples, the UE may be configured with a maximum transmit power for each of the radio frequency spectrum bands, such that the total maximum transmit power is less than or equal to the uplink transmission power criterion. The UE may select a first transmission power level for transmitting the first uplink message and a second transmission power level for transmitting the second uplink message based on a function of UE transmission power level over a preceding time interval. For example, the UE may perform uplink power aggregation techniques to temporarily boost transmit power of the first uplink message or the second uplink message, or both, while satisfying the uplink transmission power criterion.

A method for wireless communications at a UE is described. The method may include receiving, from a base station, control signaling that schedules uplink transmission of a first uplink message via a first radio frequency spectrum band and a second uplink message via a second radio frequency spectrum band, selecting, to satisfy an uplink transmission power criterion, a first transmission power level for transmission via the first radio frequency spectrum band and a second transmission power level for transmission via the second radio frequency spectrum band based on a function of UE transmission power over a preceding time interval, and transmitting the first uplink message via the first radio frequency spectrum band at the first transmission power level, or the second uplink message via the second radio frequency spectrum band at the second transmission power level, or both.

An apparatus for wireless communications at a UE is described. The apparatus may include a processor, memory coupled with the processor, and instructions stored in the memory. The instructions may be executable by the processor to cause the apparatus to receive, from a base station, control signaling that schedules uplink transmission of a first uplink message via a first radio frequency spectrum band and a second uplink message via a second radio frequency spectrum band, select, to satisfy an uplink transmission power criterion, a first transmission power level for transmission via the first radio frequency spectrum band and a second transmission power level for transmission via the second radio frequency spectrum band based on a function of UE transmission power over a preceding time interval, and transmit the first uplink message via the first radio frequency spectrum band at the first transmission power level, or the second uplink message via the second radio frequency spectrum band at the second transmission power level, or both.

Another apparatus for wireless communications at a UE is described. The apparatus may include means for receiving, from a base station, control signaling that schedules uplink transmission of a first uplink message via a first radio frequency spectrum band and a second uplink message via a second radio frequency spectrum band, means for selecting, to satisfy an uplink transmission power criterion, a first transmission power level for transmission via the first radio frequency spectrum band and a second transmission power level for transmission via the second radio frequency spectrum band based on a function of UE transmission power over a preceding time interval, and means for transmitting the first uplink message via the first radio frequency spectrum band at the first transmission power level, or the second uplink message via the second radio frequency spectrum band at the second transmission power level, or both.

A non-transitory computer-readable medium storing code for wireless communications at a UE is described. The code may include instructions executable by a processor to receive, from a base station, control signaling that schedules uplink transmission of a first uplink message via a first radio frequency spectrum band and a second uplink message via a second radio frequency spectrum band, select, to satisfy an uplink transmission power criterion, a first transmission power level for transmission via the first radio frequency spectrum band and a second transmission power level for transmission via the second radio frequency spectrum band based on a function of UE transmission power over a preceding time interval, and transmit the first uplink message via the first radio frequency spectrum band at the first transmission power level, or the second uplink message via the second radio frequency spectrum band at the second transmission power level, or both.

In some examples of the method, apparatuses, and non-transitory computer-readable medium described herein, the selecting may include operations, features, means, or instructions for selecting the first transmission power level based on the first radio frequency spectrum band having a higher priority than the second radio frequency spectrum band and selecting the second transmission power level based on the first transmission power level, where a sum of the first transmission power level and the second transmission power level satisfies the uplink transmission power criterion.

In some examples of the method, apparatuses, and non-transitory computer-readable medium described herein, the uplink transmission power criterion may be a threshold statistical transmission power permitted over the preceding time interval and the preceding time interval corresponds to a symbol period, a transmission occasion within a slot, or a transmission occasion over a set of multiple slots.

In some examples of the method, apparatuses, and non-transitory computer-readable medium described herein, the first transmission power level may be selected to satisfy a first transmission power limit for the first radio frequency spectrum band and the second transmission power level may be selected to satisfy a second transmission power limit for the second radio frequency spectrum band.

In some examples of the method, apparatuses, and non-transitory computer-readable medium described herein, the first transmission power limit may be determined prior to the second transmission power limit based on the first radio frequency spectrum band having a higher priority than the second radio frequency spectrum band.

In some examples of the method, apparatuses, and non-transitory computer-readable medium described herein, the first radio frequency spectrum band may have the higher priority based on carrier frequencies, bandwidths, power classes, subcarrier spacing configurations, cyclic prefix configurations, power classes, or any combination thereof, of at least a first uplink carriers in the first radio frequency spectrum band and at least a second uplink carriers in the second radio frequency spectrum band.

In some examples of the method, apparatuses, and non-transitory computer-readable medium described herein, the first radio frequency spectrum band may have the higher priority based on the first radio frequency spectrum band corresponding to a primary cell and the second radio frequency spectrum band not corresponding to the primary cell.

In some examples of the method, apparatuses, and non-transitory computer-readable medium described herein, the first radio frequency spectrum band may have the higher priority based on message content priorities, channel priorities, channel types, or any combination thereof, associated with the first uplink message transmitted on at least a first uplink carrier of the first radio frequency spectrum band and the second uplink message transmitted on at least a second uplink carrier of the second radio frequency spectrum band.

Some examples of the method, apparatuses, and non-transitory computer-readable medium described herein may further include operations, features, means, or instructions for dropping transmission of the second uplink message based on setting the second transmission power limit for the second radio frequency spectrum band to zero.

Some examples of the method, apparatuses, and non-transitory computer-readable medium described herein may further include operations, features, means, or instructions for receiving control signaling indicating a power scaling ratio for performing power scaling between a first transmission power sum for the first radio frequency spectrum band and a second transmission power sum for the second radio frequency spectrum band, where the first transmission power limit and the second transmission power limit may be based on the power scaling ratio.

In some examples of the method, apparatuses, and non-transitory computer-readable medium described herein, the power scaling ratio indicates equal power scaling between the first transmission power sum for the first radio frequency spectrum band and the second transmission power sum for the second radio frequency spectrum band.

Some examples of the method, apparatuses, and non-transitory computer-readable medium described herein may further include operations, features, means, or instructions for receiving, from the base station, an indication of a duration of the preceding time interval via downlink control information, a medium access control (MAC) control element (CE), radio resource control (RRC) signaling, or any combination thereof.

Some examples of the method, apparatuses, and non-transitory computer-readable medium described herein may further include operations, features, means, or instructions for receiving control signaling indicating a first transmission power limit for the first radio frequency spectrum band and a second transmission power limit for the second radio frequency spectrum band.

In some examples of the method, apparatuses, and non-transitory computer-readable medium described herein, the transmitting may include operations, features, means, or instructions for transmitting the first uplink message at the first transmission power level that satisfies the first transmission power limit and the second uplink message at the second transmission power level that satisfies the second transmission power limit, where the first transmission power level and the second transmission power level satisfy the uplink transmission power criterion.

Some examples of the method, apparatuses, and non-transitory computer-readable medium described herein may further include operations, features, means, or instructions for receiving, from the base station, the control signaling that schedules uplink transmission of a third uplink message via a third radio frequency spectrum band, selecting, to satisfy the uplink transmission power criterion, a third transmission power level for transmission via the third radio frequency spectrum band based on the function of the UE transmission power over the preceding time interval, where the first transmission power level, the second transmission power level, and the third transmission power level satisfy the uplink transmission power criterion, and transmitting the third uplink message via the third radio frequency spectrum band at the third transmission power level.

In some examples of the method, apparatuses, and non-transitory computer-readable medium described herein, receiving the control signaling may include operations, features, means, or instructions for receiving, from the base station, the control signaling that schedules uplink transmission in a subset of a set of multiple radio frequency spectrum bands, where transmission power levels of the UE for the subset of the set of multiple radio frequency spectrum bands satisfy the uplink transmission power criterion.

In some examples of the method, apparatuses, and non-transitory computer-readable medium described herein, the first radio frequency spectrum band and the second radio frequency spectrum band may be configured for a carrier aggregation configuration or a dual connectivity configuration, or both.

In some examples of the method, apparatuses, and non-transitory computer-readable medium described herein, the uplink transmission power criterion corresponds to a SAR.

A method for wireless communications at a base station is described. The method may include transmitting, to a UE, control signaling that schedules uplink transmission of a first uplink message via a first radio frequency spectrum band and a second uplink message via a second radio frequency spectrum band, transmitting a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion, and monitoring for the first uplink message via the first radio frequency spectrum band communicated at the first transmission power level, or the second uplink message via the second radio frequency spectrum band communicated at the second transmission power level, or both.

An apparatus for wireless communications at a base station is described. The apparatus may include a processor, memory coupled with the processor, and instructions stored in the memory. The instructions may be executable by the processor to cause the apparatus to transmit, to a UE, control signaling that schedules uplink transmission of a first uplink message via a first radio frequency spectrum band and a second uplink message via a second radio frequency spectrum band, transmit a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion, and monitor for the first uplink message via the first radio frequency spectrum band communicated at the first transmission power level, or the second uplink message via the second radio frequency spectrum band communicated at the second transmission power level, or both.

Another apparatus for wireless communications at a base station is described. The apparatus may include means for transmitting, to a UE, control signaling that schedules uplink transmission of a first uplink message via a first radio frequency spectrum band and a second uplink message via a second radio frequency spectrum band, means for transmitting a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion, and means for monitoring for the first uplink message via the first radio frequency spectrum band communicated at the first transmission power level, or the second uplink message via the second radio frequency spectrum band communicated at the second transmission power level, or both.

A non-transitory computer-readable medium storing code for wireless communications at a base station is described. The code may include instructions executable by a processor to transmit, to a UE, control signaling that schedules uplink transmission of a first uplink message via a first radio frequency spectrum band and a second uplink message via a second radio frequency spectrum band, transmit a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion, and monitor for the first uplink message via the first radio frequency spectrum band communicated at the first transmission power level, or the second uplink message via the second radio frequency spectrum band communicated at the second transmission power level, or both.

In some examples of the method, apparatuses, and non-transitory computer-readable medium described herein, transmitting the control message may include operations, features, means, or instructions for transmitting the control message via downlink control information, a MAC CE, RRC signaling, or any combination thereof.

Some examples of the method, apparatuses, and non-transitory computer-readable medium described herein may further include operations, features, means, or instructions for transmitting control signaling indicating a power scaling ratio for the UE to perform power scaling between a first transmission power sum for the first radio frequency spectrum band and a second transmission power sum for the second radio frequency spectrum band, where a first transmission power limit and a second transmission power limit may be based on the power scaling ratio.

In some examples of the method, apparatuses, and non-transitory computer-readable medium described herein, the power scaling ratio indicates equal power scaling between the first transmission power sum for the first radio frequency spectrum band and the second transmission power sum for the second radio frequency spectrum band.

Some examples of the method, apparatuses, and non-transitory computer-readable medium described herein may further include operations, features, means, or instructions for transmitting, to the UE, the control message that schedules uplink transmission of a third uplink message via a third radio frequency spectrum band, where the first transmission power level, the second transmission power level, and a third transmission power level for transmission via the third radio frequency spectrum band satisfy the uplink transmission power criterion and monitoring for the third uplink message via the third radio frequency spectrum band.

In some examples of the method, apparatuses, and non-transitory computer-readable medium described herein, transmitting the control message may include operations, features, means, or instructions for transmitting, to the UE, the control message that schedules uplink transmission in a subset of a set of multiple radio frequency spectrum bands, where transmission power levels of the UE for the subset of the set of multiple radio frequency spectrum bands satisfy the uplink transmission power criterion.

In some examples of the method, apparatuses, and non-transitory computer-readable medium described herein, the first radio frequency spectrum band and the second radio frequency spectrum band may be configured for a carrier aggregation configuration or a dual connectivity configuration, or both.

In some examples of the method, apparatuses, and non-transitory computer-readable medium described herein, the uplink transmission power criterion corresponds to a SAR.

DETAILED DESCRIPTION

Figure 1:
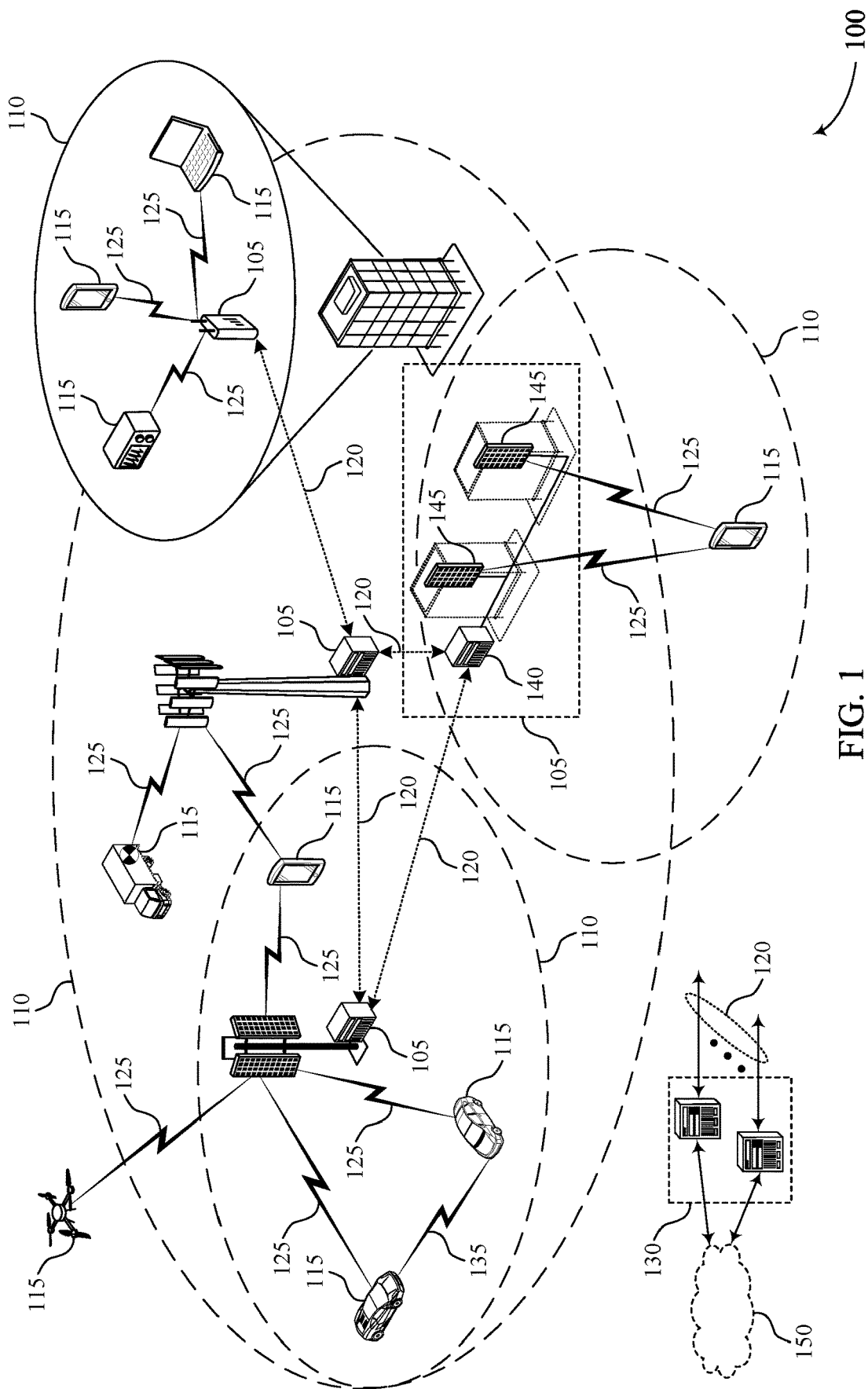
FIG. 1 illustrates an example of a wireless communications system that supports power scaling for dynamic power aggregation in accordance with aspects of the present disclosure.

Some wireless communication systems may support a carrier aggregation configuration to increase data rates and data capacity for uplink and downlink transmissions, such as between a user equipment (UE) and one or more base stations. To transmit on different carriers or bands, the UE may have multiple power amplifiers that may each be used to transmit at a maximum transmit power on a given carrier or band. In some cases, a UE may combine the use of its power amplifiers (e.g., perform power aggregation) to increase the total available transmit power. However, if each power amplifier is used to its maximum capacity, the combined or aggregated transmit power (an instantaneous transmit power) may exceed a predetermined power limit, such as a power limit that is based on a specific absorption rate (SAR) requirement. To keep the average transmit power below the predetermined SAR-oriented power limit (i.e., to maintain SAR compliance) a UE may dynamically adjust its instantaneous transmit power such that the average transmit power for a given time window does not exceed the predetermined SAR threshold. If the UE is configured with multiple different bands, the UE may perform power scaling across the multiple bands such that the total transmit power across all of the bands complies with the SAR.

The present disclosure provides techniques for performing power scaling for dynamic power aggregation across multiple different bands or component carriers. For example, if an average of the total transmit power on the different bands over a duration of time would exceed a limit (e.g., the SAR-oriented power limit), the UE may scale down power for the bands according to priority. The duration of time or window for determining the average transmit power may be a previous symbol, a slot, or multiple slots. In some cases, the UE may set power amplifier limits for bands separately. In some examples, the UE may perform maximum power reduction for some bands prior to other bands. For example, the UE may reduce, or scale down, a first average power limit for a first, lower priority band prior to performing power scaling for a second, higher priority band. If the total transmit power limit is not satisfied after scaling power down for the lower priority band, the UE may scale a transmit power limit for remaining bands, such as the higher priority band, to satisfy the total transmit power limit. The UE may determine priority to perform power reductions based on semi-static factors such as carrier frequencies, bandwidth, subcarrier spacing configurations, and the like. In some cases, the UE may perform power reductions based on dynamic factors, such as message content priorities, channel priorities, and channel types. In some cases, the UE may drop transmission on one or more bands after performing power scaling if transmission on multiple bands cannot satisfy the total transmit power limit.

Aspects of the disclosure are initially described in the context of wireless communications systems. Aspects of the disclosure are further illustrated by and described with reference to apparatus diagrams, system diagrams, and flowcharts that relate to power scaling for dynamic power aggregation.

FIG. 1 illustrates an example of a wireless communications system 100 that supports power scaling for dynamic power aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support techniques for power scaling for dynamic power aggregation. For example, a UE 115 may be scheduled for uplink transmissions on uplink carriers in multiple radio frequency spectrum bands. Each radio frequency spectrum band may have a separate power amplifier limit for an uplink transmit power over a window or duration of time. However, the total power amplifier limit for the bands may exceed a total transmit power limit which may be configured for the UE, such as a SAR-oriented power limit or a power limit derived from a SAR requirement. A SAR limit may apply to frequency bands below a certain frequency (e.g., 6 GHz). For frequency bands above that certain frequency, there may be another limit, such as a power density limit. In some examples, SAR limit management and power density limit management may be mutually independent. The techniques described herein may be implemented based on a SAR-oriented power limit or a power density-oriented power limit, or both. In some cases, the total transmit power limit, or the uplink transmit power criterion, may be based on a frequency range of the one or more radio frequency spectrum bands.

The UE 115 may perform power scaling on the different bands to comply with the total transmit power limit. In some cases, the UE 115 may perform a maximum power reduction on one or some frequency bands prior to performing a maximum power reduction on other bands. If the power scaling, or power dropping, on the one or more frequency bands (e.g., the first frequency band) is not sufficient, the UE 115 may perform power-scaling on other, remaining frequency bands.

In some cases, the UE 115 may perform maximum power reduction on radio frequency spectrum bands based on power classes of the radio frequency spectrum bands. For example, if a power amplifier limit of a first radio frequency spectrum band is twice that of a power amplifier limit of a second radio frequency spectrum band, the UE 115 may allocate two thirds of the total transmit power limit to transmissions on uplink carriers of the first radio frequency spectrum band and one third of the total transmit power limit to transmissions on uplink carriers of the second radio frequency spectrum band. In some examples, the UE 115 may be configured with a power scaling factor, and the UE 115 may scale transmit power limits on the radio frequency spectrum bands based on the power scaling factor.

These techniques may enable a UE 115 to perform power scaling on radio frequency spectrum bands implementing dynamic power aggregation. By implementing these techniques, the UE 115 may comply with a transmit power limitation while maintaining higher transmission power for higher priority signaling, bands, or channels.

Figure 2:
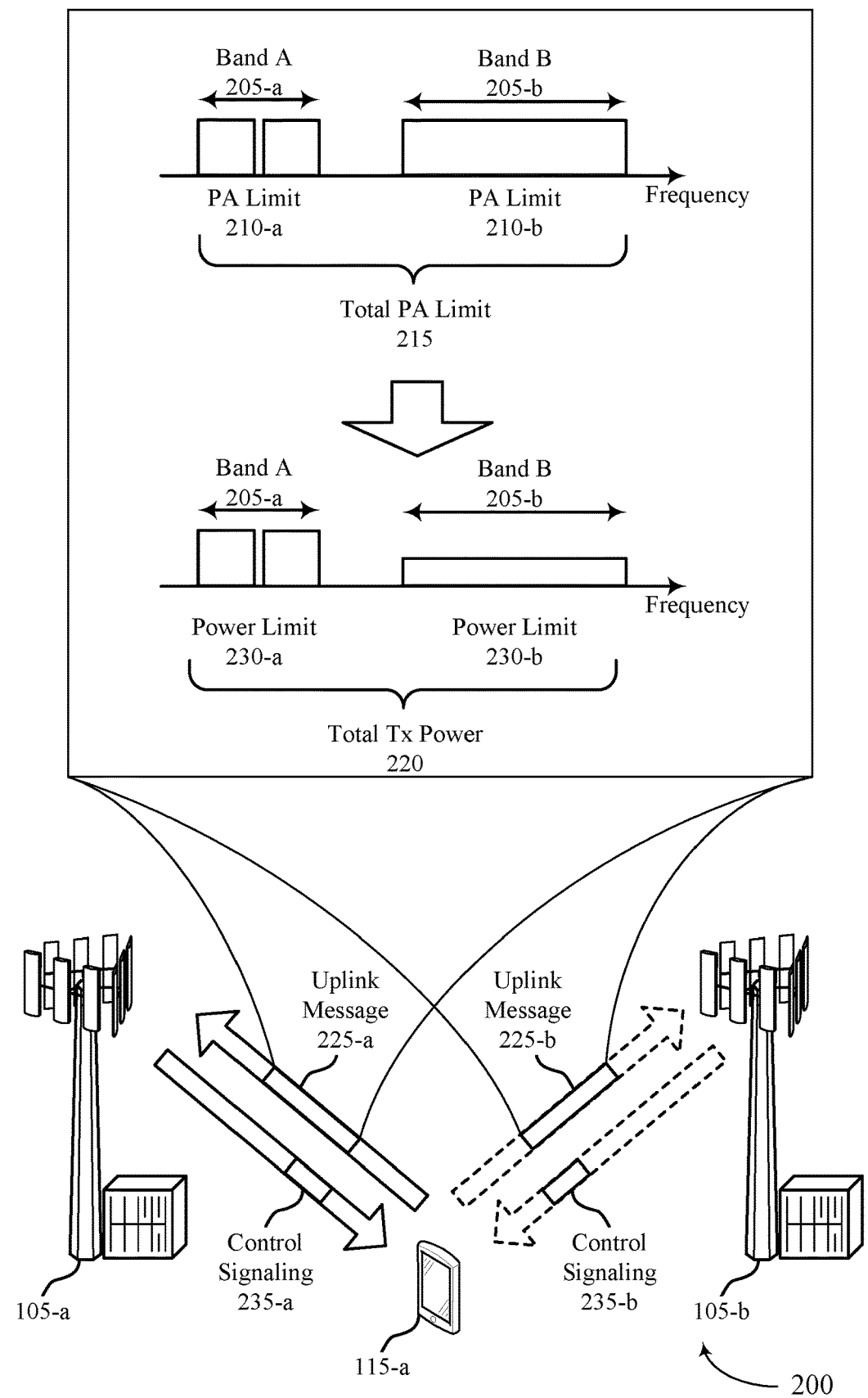
FIG. 2 illustrates an example of a wireless communications system that supports power scaling for dynamic power aggregation in accordance with aspects of the present disclosure.

FIG. 2 illustrates an example of a wireless communications system 200 that supports power scaling for dynamic power aggregation in accordance with aspects of the present disclosure. The wireless communications system 200 may include a UE 115-a and one or more base stations 105, such as a base station 105-a or a base station 105-b, or both, which may be respective examples of a UE 115 and a base station 105 as described with reference to FIG. 1.

The UE 115-a may support techniques for dynamic power aggregation. Dynamic power aggregation may enable the UE 115-a to use a total available peak power for a short duration. The UE 115-a may exceed a power limit for a short duration to use a higher transmit power as long as the UE 115-a complies with the power limit over a longer window or duration of time. For example, an averaged power at time t, $P_{ave}(t)$, may be determined by averaging an instantaneous transmit power, $P_{inst}(t')$, within a window. The UE 115-a may set an instantaneous transmit power at time t so that $P_{ave}(t)$ (e.g., a function of UE transmission power over a preceding time interval for one or more bands) is less than an average power limit, $P_{ave,max}$. The UE 115-a may set the instantaneous transmit power, $P_{inst}(t)$ to be scaled down from the requested power at time t, $P_{req}(t)$. These techniques may provide an uplink peak data rate boost and correspondingly increase uplink user perceived throughput while complying with a transmit power limit. Additional aspects and examples of dynamic power aggregation are described in more detail with reference to FIG. 5. In some cases, a base station 105 may transmit an indication of the duration of time, or the window, to the UE 115-a. For example, base station 105-a or base station 105-b, or both, may transmit control signaling 235, such as control signaling 235-a and control signaling 235-b, including an indication of the duration of time or window.

The UE 115-a may be configured for carrier aggregation. For example, the UE 115-a may be configured with one or more uplink carriers in one or more radio frequency spectrum bands, such as a first frequency band 205-a and a second frequency band 205-b. In the example of the wireless communications system 200, the first frequency band 205-a may include two uplink carriers, and the second frequency band 205-b may include one uplink carrier, although the UE 115-a may be configured with a different number of radio frequency spectrum bands or a different number of uplink carriers per radio frequency spectrum band in other examples. In some cases, different base stations 105 may provide uplink carriers on different radio frequency spectrum bands. For example, the base station 105-a may provide uplink carriers on the first frequency band 205-a, and the base station 105-b may provide uplink carriers on the second frequency band 205-b. Additionally, or alternatively, a single base station 105 may provide uplink carriers on multiple different radio frequency spectrum bands.

In some cases, each radio frequency spectrum band may have a power amplifier limit 210. For example, the first frequency band 205-a may have a first power amplifier limit 210-a, and the second frequency band 205-b may have a second power amplifier limit 210-b. The UE 115-a may perform dynamic power aggregation techniques while transmitting on each frequency band 205, adjusting an uplink transmit power to comply with the power amplifier limit 210 within a window or duration of time. The power amplifier limits 210 together may result in a total power amplifier limit 215 for transmission on both frequency bands 205. For example, if the first power amplifier limit 210-a for uplink transmission on uplink carriers of the first frequency band 205-a is up to 23 dBm, and the second power amplifier limit 210-b for uplink transmission on uplink carriers of the second frequency band 205-b is up to 26 dBm, the total power amplifier limit 215 may be approximately 28 dBm for the uplink carrier aggregation configuration.

In some cases, the UE 115-a may reduce a total transmit power across frequency bands 205 of the carrier aggregation configuration. For example, the UE 115-a may implement, or be configured with, a total transmit power limit 220 which is lower than the total power amplifier limit 215. The total transmit power limit 220 may be an example of an uplink transmission power criterion. For example, the total transmit power limit 220 may correspond to an SAR-oriented power limit or a configuration for the wireless communications system 200, or both. In an example, the total transmit power limit 220 may be 24 dBm. If the UE 115-a is scheduled for an uplink message 225-a on one or more uplink carriers of the first frequency band 205-a, and the UE 115-a is scheduled for an uplink message 225-b on one or more uplink carriers of the second frequency band 205-b, the UE 115-a may perform power scaling for the frequency bands 205 to comply with the total transmit power limit 220.

The total UE transmit power across all component carriers or bands in a given frequency range for a duration of time may be determined as $P_{CMAX}(i)$, which may consider the power scaling due to dynamic power aggregation. If a sum of transmit powers across the frequency bands 205, or across component carriers in the frequency bands 205, in a frequency range, would exceed the total transmit power limit 220 within the duration of time, the UE 115-a may allocate power to transmissions according to priority order. The power allocation, including $P_{CMAX}(i)$ determination, may be per symbol, per transmission occasion within a slot, or per transmission occasion over multiple slots. A transmission occasion may correspond to a combination of a starting symbol S of a channel or signal and its length L, such as a number of symbols or slots of the channel or signal. A transmission occasion over multiple slots may correspond to a multi-slot uplink transmission, where transmission is coherent across multiple slots. The determined $P_{CMAX}(i)$ may be used as an instantaneous transmit power at time t, $P_{inst}(t)$, in order to compute an averaged transmit power at time t, $P_{ave}(t)$. The unit of time t may be one or more symbols, a transmission occasion within a slot, or a transmission occasion over multiple slots. In some cases, the base station 105-a or the base station 105-b, or both, may transmit control signaling 235, such as control signaling 235-a and control signaling 235-b, including an indication of the unit of time, t. For example, the base station 105 may configure the t to be one or more symbols, a transmission occasion within a slot, or a transmission occasion across multiple slots.

For example, if the UE 115-a is scheduled for the uplink message 225-a and the uplink message 225-b, the UE 115-a may determine that transmission on uplink carriers of both of the frequency bands 205 may exceed $P_{CMAX}(i)$, or the total transmit power limit 220, over a duration of time. Therefore, the UE 115-a may allocate power to the transmissions according to priority. In some cases, techniques for power scaling or power allocation may be similar or related. For example, the UE 115-a may allocate power to transmissions in order to comply with the total transmit power limit 220, or the UE 115-a may reduce transmission power or scale down power for a frequency band 205 to comply with the total transmit power limit 220, or both.

In some cases, the UE 115-a may perform power scaling for dynamic power aggregation based on the frequency bands 205 having independent power amplifier limits 210. A maximum power reduction may be performed on one or more frequency bands 205 prior to performing a maximum power reduction on one or more other frequency bands 205. For example, the UE 115-a may scale down transmission power for a lower priority transmission, or for a lower priority frequency band 205, before scaling down transmission power for a higher priority transmission, or a higher priority frequency band 205.

In some examples, a priority for a frequency band 205 may be determined based on semi-static factors. For example, the priority may be determined based on carrier frequency (e.g., a lower band may have higher priority than a higher band), bandwidth, subcarrier spacing (SCS) configuration, cyclic prefix configuration, or power class of the frequency band 205, or any combination thereof. For example, a frequency band 205 with a lower bandwidth may be treated as higher priority than a frequency band 205 with a higher bandwidth, or a narrower band may be considered higher priority than a wider band. In some cases, a priority for a frequency band 205 may be determined based on whether the frequency band 205 includes a primary cell. For example, the first frequency band 205-a may include multiple uplink carriers including a primary cell, and the second frequency band 205-b may include one or multiple carriers which are secondary cells but not a primary cell, and the first frequency band 205-a may have a higher priority than the second frequency band 205-b based having the primary cell. In another example, a power class 2 band may have a higher priority than a power class 3 band. In some cases, a power class 1.5 band may have a higher priority than a power class 2 or power class 3 band. In some other examples, priority orderings may be different. For example, a power class 3 band may have a higher priority than a power class 2 band or a power class 1.5 band, among other variations or orderings. These techniques for determining priority are exemplary and may include additional configurations or determinations. For example, in some other configurations, a higher frequency band may have a higher priority than a lower frequency band, or a wider band may have a higher priority than a narrow frequency band.

Additionally, or alternatively, a priority for a frequency band 205 may be determined based on dynamic factors. For example, the priority may be determined based on an uplink control information priority order (e.g., a scheduling request or HARQ acknowledgment may have a higher priority than CSI), uplink shared channel priority, channel types, or any combination thereof. For example, the uplink message 225-a may be transmitted on uplink shared channel resources with a high priority index, and the uplink message 225-b may be transmitted on uplink shared channel resources with a low priority index. Therefore, the first frequency band 205-a may be considered to be higher priority than the second frequency band 205-b, and the UE 115-a may perform power scaling on the second frequency band 205-b before performing power scaling on the first frequency band 205-a. In another example, channel types may be used to determine priority. For example, the frequency band having transmission of a physical random access channel (PRACH) may have higher priority than the frequency band having transmission of a physical uplink control channel (PUCCH), which may have higher priority than a physical uplink channel (PUSCH), which may have higher priority than a sounding reference signal (SRS) resource (e.g., PRACH>PUCCH>PUSCH>SRS). If there are simultaneous transmission of multiple channels/signals on a frequency band, the priority of the frequency band may be determined based on the channel/signal that has the highest (or the lowest) priority based on the predefined order (e.g., PRACH>PUCCH>PUSCH>SRS).

In an example, the UE 115-a may determine that the first frequency band 205-a has a higher priority than the second frequency band 205-b based on one or more semi-static or dynamic factors. The first frequency band 205-a may have a first power amplifier limit 210-a of 23 dBm, the second frequency band 205-b may have a second power amplifier limit 210-b of 26 dBm, and the total transmit power limit 220 may be 24 dBm. The UE 115-a may first perform power scaling, or power reduction, on the second frequency band 205-b based on having the lower priority. The UE 115-a may reduce a transmit power on uplink carriers of the second frequency band 205-b to satisfy a second power limit 230-b of 17 dBm, thereby satisfying the total transmit power limit 220 for both frequency bands 205. In this example, configuring the second power limit 230-b of 17 dBm may satisfy the total transmit power limit 220 without changing a first power limit 230-a for the first frequency band 205-a, as 23 dBm for the first frequency band 205-a and 17 dBm for the second frequency band 205-b may satisfy the total transmit power limit 220 of 24 dBm.

If the power scaling, or power dropping, on one or more frequency bands is not sufficient to satisfy the total transmit power limit 220, the UE 115-a may perform power scaling on carriers in remaining frequency bands 205. An example of performing power scaling on remaining frequency bands 205 is described in more detail with reference to FIG. 3.

In some cases, maximum power reduction may be performed on the frequency bands 205 so that allocated transmit power is based on a ratio of UE power classes of the frequency bands 205. For example, the first frequency band 205-a may a first power amplifier limit 210-a of 23 dBm, and the second frequency band 205-b may have a second power amplifier limit 210-b of 26 dBm, or twice that of the first power amplifier limit 210-a. Transmit power for the two frequency bands 205 may be allocated such that one third of the total transmit power limit 220 is allocated to the first frequency band 205-a, and two thirds of the total transmit power limit 220 is allocated to the second frequency band 205-b. For example, if the total transmit power limit 220 is 20 dBm, the UE 115-a may use a first power limit 230-a that is one third of 20 dBm for the first frequency band 205-a and use a second power limit 230-b that is two thirds of 20 dBm for the second frequency band 205-b.

In some examples, maximum power reduction may be performed on the frequency bands 205 using an equal scaling factor. For example, if there are two frequency bands 205, the UE 115-a may use half of the total transmit power limit 220 for each of the two frequency bands 205.

In some examples, the UE 115-*a* may be configured with a maximum power for one or more frequency bands 205. For example, the base station 105-*a* or the base station 105-*b*, or both, may transmit control signaling 235 to configure a maximum power, or a power limit 230, for a frequency band 205. For example, the UE 115-*a* may be configured with the first power limit 230-*a* for the first frequency band 205-*a* and the second power limit 230-*b* for the second frequency band 205-*b*, where the sum of maximum power across the frequency bands 205 does not exceed the total transmit power limit 220 or $P_{ave\_limit}$. The UE 115-*a* may determine the first power limit 230-*a*, $P_a$, and the second power limit 230-*b*, $P_b$, such that $P_a+P_b \leq P_{ave\_liim}$, or the total transmit power limit 220. If a sum of the power limits 230 is set to equal the total transmit power limit 220, the maximum transmit power for the bands can always be equal to the power limits 230, such as according to dynamic power aggregation techniques.

If the power limits 230 are set to below the total transmit power limit 220, the UE 115-*a* may set the maximum power for an individual frequency band 205 equal to the power amplifier limit 210 for a certain duration of time. For example, the $P_{ave\_limit}$ may be set to 23 dBm, and the UE 115-*a* may be configured with a first power limit 230-*a*, $P_a$, of 17 dBm and a second power limit 230-*b*, $P_b$, of 17 dBm. The UE 115-*a* may set the maximum power as 23 dBm for the first frequency band 205-*a* and 26 dBm for the second frequency band 205-*b* for 20% of the time, and the UE 115-*a* may set the maximum power as 17 dBm for the first frequency band 205-*a* and 17 dBm for the second frequency band 205-*b* for the remaining 80% of the time to satisfy $P_{ave\_limit}$. In some cases, the UE transmit power for the frequency bands 205 may not reach the maximum values. For example, depending on the actual transmit power on the frequency bands, the availability of 23 dBm for the first frequency band 205-*a* and/or 26 dBm for the second frequency band 205-*b* may vary (e.g., and may not consistently correspond to a fixed ratio). The UE 115-*a* may check previous, current, or future power allocation and determine or set the maximum transmit powers on the frequency bands 205, as long as the average transmit power across the frequency bands 205 is controlled to be less than or equal to $P_{ave\_limit}$, providing further flexibility for uplink transmit power allocation. In other words, a function of UE transmission power over a preceding time interval for one or more bands (e.g., $P_{ave}$) satisfies $P_{ave\_limit}$.

In some cases, a power limit 230 for a frequency band 205 may be applied across all configured uplink carriers of the frequency band 205. For example, the first frequency band 205-*a* may have two uplink carriers, and the sum of uplink transmit power across all uplink carriers of the first frequency band 205-*a* may satisfy the first power limit 230-*a* based on dynamic power aggregation techniques.

These techniques of power scaling for dynamic power aggregation may be implemented for carrier aggregation configurations or dual connectivity configurations, or both. For example, these techniques may be implemented for NR carrier aggregation, NR dual connectivity, EN dual connectivity, or any combination thereof.

Figure 3:
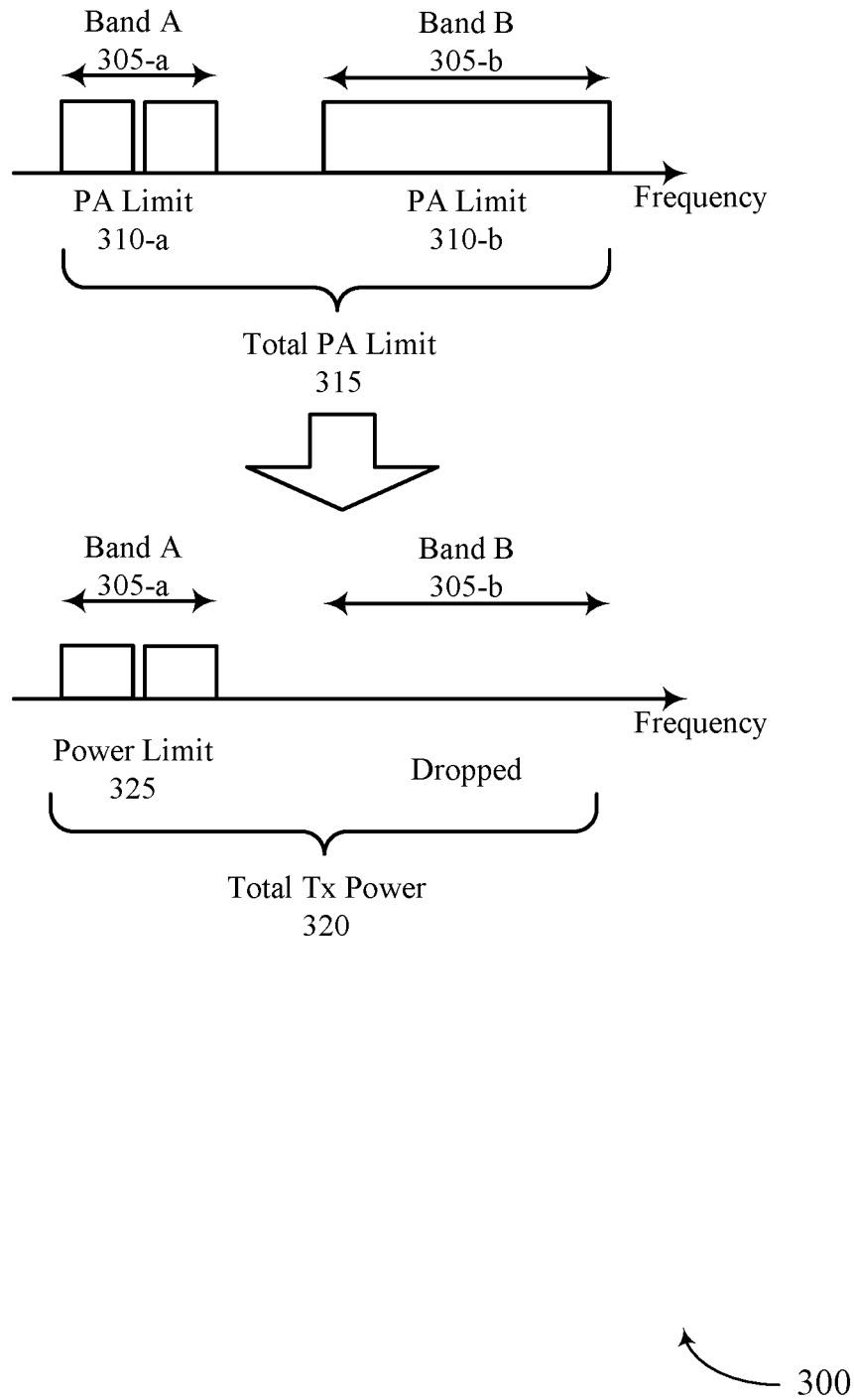
FIG. 3 illustrates an example of a power scaling configuration that supports power scaling for dynamic power aggregation in accordance with aspects of the present disclosure.

FIG. 3 illustrates an example of an uplink transmit power configuration 300 that supports power scaling for dynamic power aggregation in accordance with aspects of the present disclosure.

In some cases, a UE 115 may perform power scaling for dynamic power aggregation based on the frequency bands 305 having independent power amplifier limits 310. The UE 115 may perform a maximum power reduction on one or more frequency bands 305 prior to performing a maximum power reduction on one or more other frequency bands 305. For example, the UE 115 may scale down transmission power for a lower priority transmission, or for a lower priority frequency band 305, before scaling down transmission power for a higher priority transmission, or a higher priority frequency band 305. The priority may be determined based on semi-static factors or dynamic factors, or both, as described with reference to FIG. 2.

In an example, a UE 115 may be configured with a first frequency band 305-*a* and a second frequency band 305-*b* in a carrier aggregation configuration. The first frequency band 305-*a* may have a first power amplifier limit 310-*a*, and the second frequency band 305-*b* may have a second power amplifier limit 310-*b*. The UE 115 may determine that the first frequency band 305-*a* has a higher priority than the second frequency band 305-*b* based on one or more semi-static or dynamic factors. In an example, the first frequency band 305-*a* may have a first power amplifier limit 310-*a* of 23 dBm, the second frequency band 305-*b* may have a second power amplifier limit 310-*b* of 26 dBm, and a total power amplifier limit 315 of 28 dBm. However, the UE 115 may be configured with an uplink transmission power criterion, such as a total transmit power limit 320 of 20 dBm.

The UE 115 may first perform power scaling, or power reduction, on the second frequency band 305-*b* based on the first frequency band 305-*a* having a higher priority. The UE 115 may reduce a transmit power on uplink carriers of the second frequency band 305-*b*, for example by dropping the transmission or setting the uplink transmit power for the second frequency band 305-*b* to zero. However, performing the power scaling on the second frequency band 305-*b* may not be sufficient to satisfy the total transmit power limit 320. Therefore, the UE 115 may perform power scaling on other, remaining frequency bands 305, such as the first frequency band 305-*a*. To satisfy the total transmit power limit 320, the UE 115 may reduce the transmit power on the first frequency band 305-*a* to a power limit 325 of 20 dBm. In this example, the UE 115 only transmits on uplink carriers of the first frequency band 305-*a* to satisfy the total transmit power limit 320. The UE 115 drops transmission on uplink carriers of the second frequency band 305-*b* and sets the power limit 325 to the total transmit power limit 320, which is lower than the first power amplifier limit 310-*a*.

Figure 4:
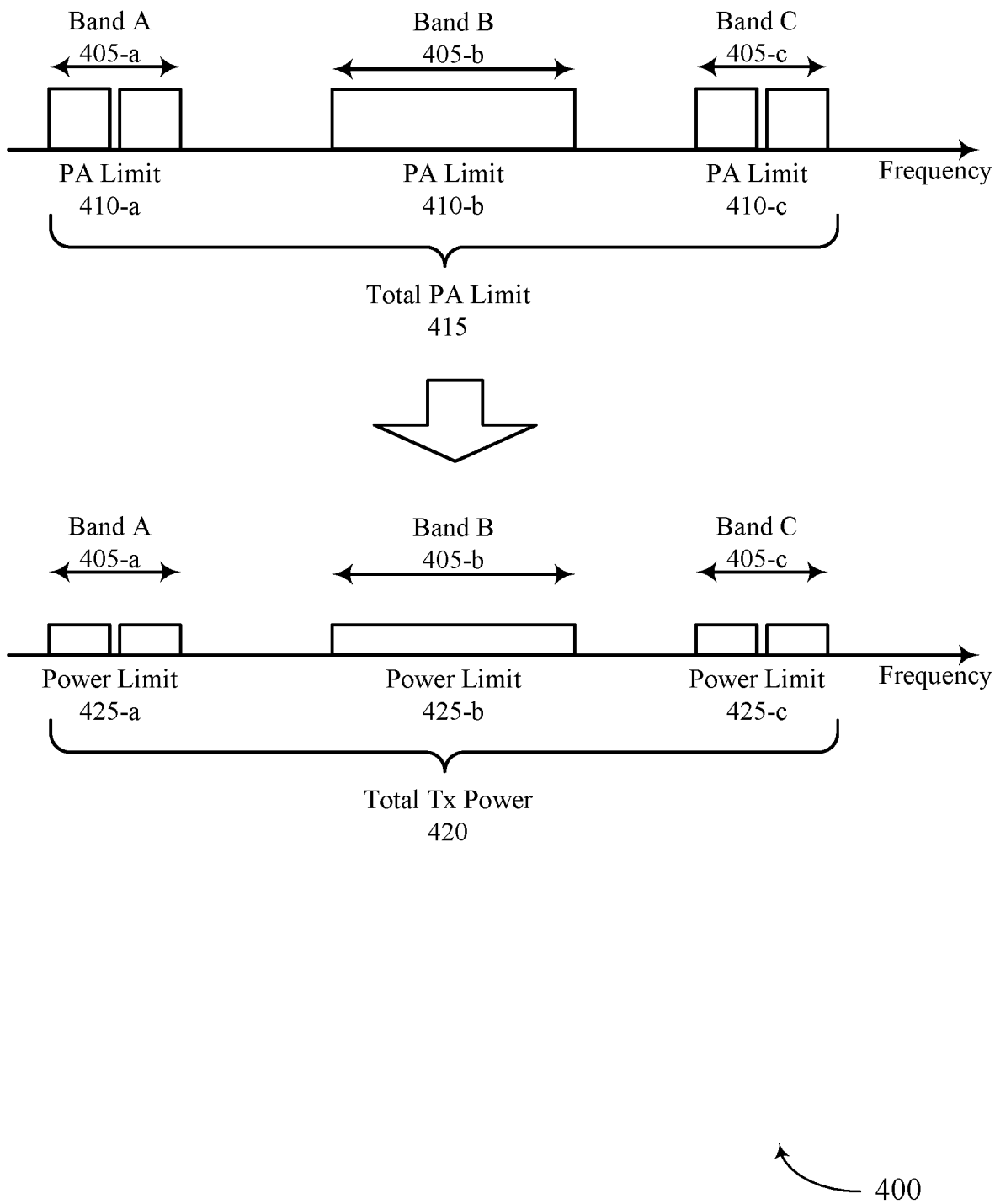
FIG. 4 illustrates an example of a power scaling configuration that supports power scaling for dynamic power aggregation in accordance with aspects of the present disclosure.

FIG. 4 illustrates an example of an uplink transmit power configuration 400 that supports power scaling for dynamic power aggregation in accordance with aspects of the present disclosure.

In some cases, a UE 115 may perform power scaling for dynamic power aggregation based on multiple frequency bands 405 having independent power amplifier limits 410. The techniques for power scaling for dynamic power aggregation may be implemented when a UE 115 is configured with more than two frequency bands 405. For example, the UE 115 may be configured with three frequency bands 405, including a first frequency band 405-*a*, a second frequency band 405-*b*, and a third frequency band 405-*c*. In some cases, some of the frequency band 405 may include multiple uplink carriers for a carrier aggregation configuration. For example, the first frequency band 405-*a* may include two uplink carriers, and the third frequency band 405-*c* may include two uplink carriers. Each frequency band 405 may have an individual power amplifier limit 410. For example, the first frequency band 405-*a* may have a first power amplifier limit 410-*a* (e.g., 23 dBm), the second frequency band 405-*b* may have a second power amplifier limit 410-*b* (e.g., 26 dBm), and the third frequency band 405-*c* may have a third power amplifier limit 410-*c* (e.g., 23 dBm). The UE 115-*a* may have a total power amplifier limit 415 (e.g., 29 dBm), which may correspond to a combination of the power amplifier limits 410. At a given time, transmission power used on any of bands 405-*a*, 405-*b*, and 405-*c* may be up to its respective power amplifier limit as long as averaged total power across the bands 405-*a*, 405-*b*, and 405-*c* does not exceed $P_{ave\_lim}$.

In some cases, the UE 115 may perform power scaling based on an equal scaling factor. For the UE 115 may be configured with three frequency bands 405, so the UE 115 may allocate one third of a total transmit power limit 420 to each frequency band 405. For example, a first power limit 425-*a* for the first frequency band 405-*a*, a second power limit 425-*b* for the second frequency band 405-*b*, and a third power limit 425-*c* for the third frequency band 405-*c* may each be equal based on the equal scaling factor.

If a frequency band 405 is not scheduled for an uplink transmission, the other bands may use transmit power allocated to that frequency band 405. For example, if the UE 115 is scheduled for uplink transmission on the first frequency band 405-*a* and the second frequency band 405-*b*, but the UE 115 is not scheduled for uplink transmission on the third frequency band 405-*c*, the UE 115 may reuse transmit power from the third power limit 425-*c* for uplink transmission on the other frequency bands 405. A frequency band 405 which does not have an uplink transmission may be considered as a zero-power carrier at that moment for maximum power determination of the bands. For example, the UE 115 may determine the power limit 425-*a* and the power limit 425-*b* based on treating the third frequency band 405-*c* as a zero-power carrier. These techniques may be implemented for other numbers of frequency bands 405, such as for configurations with two frequency bands 405.

Figure 5:
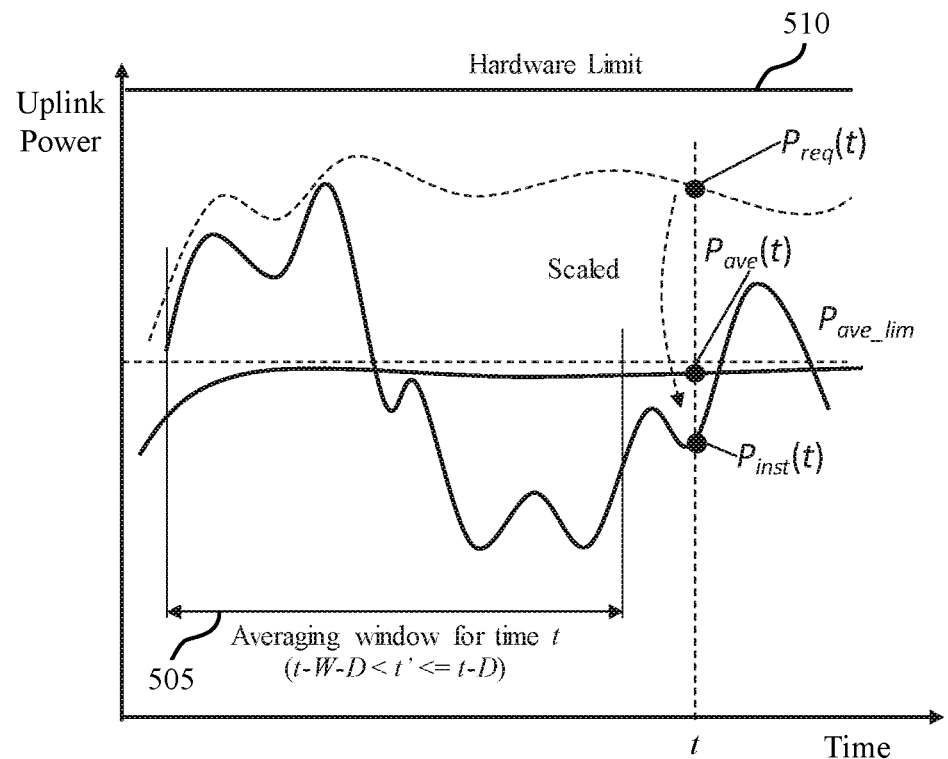
FIG. 5 illustrates an example of a power scaling configuration that supports power scaling for dynamic power aggregation in accordance with aspects of the present disclosure.

FIG. 5 illustrates an example of a timing diagram 500 that supports power scaling for dynamic power aggregation in accordance with aspects of the present disclosure. In some examples, timing diagram 500 may implement aspects of wireless communications system 100 and wireless communications system 200. For example, by implementing techniques shown by the timing diagram 500, a UE 115 may perform uplink dynamic power aggregation on power scaled frequency bands of a carrier aggregation or dual connectivity scheme.

In some examples, a UE 115 may increase an instantaneous transmission power above a threshold average transmission power based on calculating an available transmission power. The UE 115 may obtain an averaged power at time t, $P_{ave}(t)$, by averaging instantaneous transmission power, $P_{inst}(t')$ within a time interval 505, such as time interval 505. The time interval 505 may be defined at the UE 115 by a base station 105 via control signaling, as described with respect to FIG. 2. In some examples, the base station 105, the UE 115, or both may determine an averaging window, or time interval 505, for t according to Equation 1:

$$t-W-D<t'\le t-D) \qquad (1)$$

where W is the size of the window and D is the gap from the end of the window to t. In some examples, D may be 0.

The UE 115 may set an instantaneous transmit power at time t, $P_{inst}(t)$, such that $P_{ave}(t) \le$ average threshold $P_{ave\_lim}$. In some cases, $P_{ave\_lim}$ may be an example of the transmission power threshold that the UE 115 is to be below (e.g., $P_{ave,\,max}$). Therefore, the UE 115 may select the instantaneous transmit power at time t to satisfy an uplink transmission power criterion, such as $P_{ave\_lim}$, based on a function of UE transmission power over a preceding time interval (e.g., $P_{ave}$).

In some cases, the UE 115 may scale down the instantaneous transmit power Pinst(t) from the transmission power requested by the base station (e.g., in DCI or other control signaling) at time t, $P_{req}(t)$ to comply with the average threshold $P_{ave\_lim}$. In some examples, there may be a hardware limit 510 for one or more components (e.g., a transmitter, transceiver, antenna, or other transmitting device at the UE 115), which may be up to 26 decibel-milliwatts (dBm), 28 dBm, or any other value. In some examples, the UE 115 may meet a SAR condition if a value of Pave(t) is below a threshold (e.g., 23 dBm). If the value of $P_{ave}(t)$ is above the threshold, the UE 115 may take additional precautions (e.g., additional uplink duty cycle control in addition to dynamic power aggregation).

Figure 6:
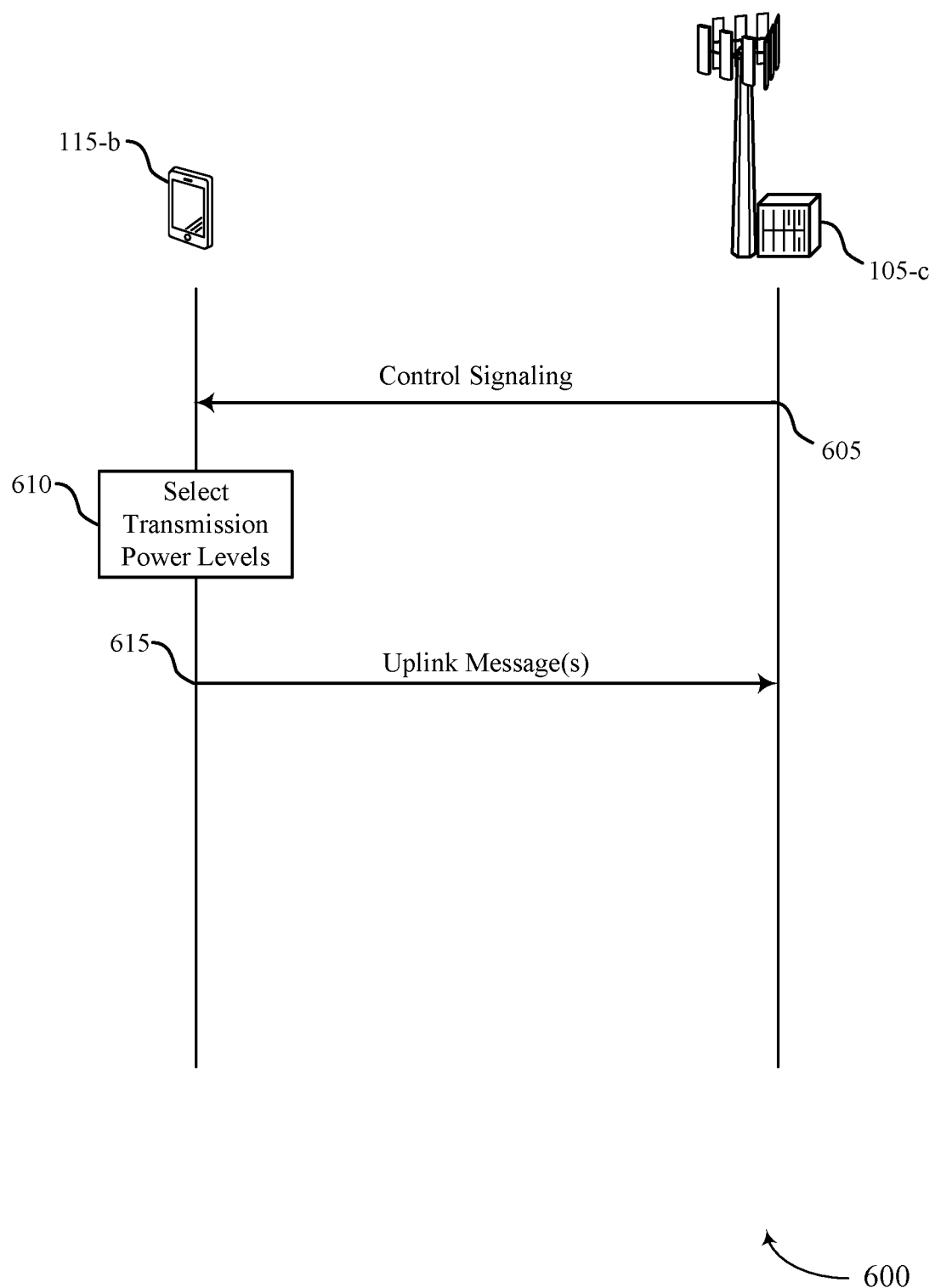
FIG. 6 illustrates an example of a process flow that supports power scaling for dynamic power aggregation in accordance with aspects of the present disclosure.

FIG. 6 illustrates an example of a process flow 600 that supports power scaling for dynamic power aggregation in accordance with aspects of the present disclosure. The process flow 600 may implement aspects of wireless communications system 100 and wireless communications system 200. The process flow 600 may be implemented by a base station 105-*c* or a UE 115-*b*, or both, which may be respective examples of a base station 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

At 605, the base station 105-*c* may transmit control signaling that schedules uplink transmission of a first uplink message via a first radio frequency spectrum band and a second uplink message via a second radio frequency spectrum band. The UE 115-*b* may receive the control signaling, scheduling the first uplink message on one or more uplink carriers of the first radio frequency spectrum band and scheduling the second uplink message on one or more uplink carriers of the second radio frequency spectrum band. The first radio frequency spectrum band and the second radio frequency spectrum band may be, for example, frequency bands of a carrier aggregation configuration or a dual connectivity configuration.

The UE 115-*b* may use separate power amplifiers for the first radio frequency spectrum band and the second radio frequency spectrum band, resulting in a large total power amplifier limit. However, the UE 115-*b* may be configured to comply with an uplink transmission power criterion, such as a SAR requirement. The uplink transmission power criterion may be lower than the total power amplifier limit. Therefore, to satisfy the uplink transmission power criterion, the UE 115-*b* may perform a power scaling operation to scale down transmission power on one or more of the radio frequency spectrum bands. For example, the UE 115-*b* may reduce a maximum transmit power, or impose a transmit power limit, for one or more of the radio frequency spectrum bands. Additionally, or alternatively, the UE 115-*b* may allocate transmission power to one or more of the radio frequency spectrum bands such that uplink transmit power across all uplink carriers of the radio frequency spectrum bands satisfies the uplink transmission power criterion.

For example, at 610, the UE 115-*b* may select, to satisfy the uplink transmission power criterion, a first transmission power level for transmission via the first radio frequency spectrum band and a second transmission power level for transmission via the second radio frequency spectrum band based on a function of UE transmission power over a preceding time interval. The UE 115-*b* may perform dynamic power aggregation techniques to satisfy the uplink transmission power criterion based on the function of UE transmission power over the preceding time interval, such as described with reference to FIGS. 2 and 5. For example, the UE 115-*b* may an set an instantaneous transmit power such that an average transmit power over the preceding time interval is less than or equal to the SAR-oriented power limit or another uplink transmission power criterion.

In some cases, the UE 115-*b* may perform a maximum power reduction on some radio frequency spectrum bands prior to other radio frequency spectrum bands, such as based on priority. The priority of a radio frequency spectrum band, or the priority between radio frequency spectrum bands, may be determined based on dynamic factors or semi-static factors, or both, as described with reference to FIG. 2.

For example, the UE 115-*b* may select the first transmission power based on the first radio frequency spectrum band having a higher priority than the second radio frequency spectrum band. The UE 115-*b* may then select the second transmission power level based on the first transmission power level, where a sum of the first transmission power level and the second transmission power level satisfies the uplink transmission power criterion. Additionally, or alternatively, the UE 115-*b* may perform a transmit power reduction on the second radio frequency spectrum band based on the second radio frequency spectrum band having a lower priority than the first radio frequency spectrum band.

In some cases, if power scaling or power dropping on a first radio frequency spectrum band is not sufficient to meet the uplink transmission power criterion, the UE 115-*b* may perform power scaling on remaining or surviving radio frequency spectrum bands. For example, if the uplink transmission power criterion cannot be met by dropping the uplink transmission on uplink carriers of the second radio frequency spectrum band, the UE 115-*b* may perform power scaling on the first radio frequency spectrum band. In this way, the UE 115-*b* may perform power scaling or power dropping on lower priority radio frequency spectrum bands before performing power scaling on higher priority radio frequency spectrum bands.

In some other examples, the UE 115-*b* may be configured with maximum power limits for the radio frequency spectrum bands. For example, the UE 115-*b* may receive control signaling indicating a first transmission power limit for the first radio frequency spectrum band and a second transmission power limit for the second radio frequency spectrum and. In some examples, the base station 105-*c* may transmit the indicate the first and second transmission power limits as part of the control signaling scheduling the UE 115-*b* for uplink transmission of the first and second uplink messages. Additionally, or alternatively, the base station 105-*c* may indicate the first and second transmission power limits in separate control signaling. The UE 115-*b* may select the first transmission power to satisfy the first transmission power limit and select the second transmission power level to satisfy the second transmission power limit based on the function of UE transmission power level over the preceding time interval, thereby satisfying the uplink transmission power criterion.

In some cases, the UE 115-*b* may select the first transmission power level and the second transmission power level based on a power scaling ratio. In some examples, the base station 105-*b* may transmit an indication of the power scaling ratio to the UE 115-*b*. In some examples, the power scaling ratio may be determined based on power classes of the configured radio frequency spectrum bands. For example, if a first power amplifier limit for the first radio frequency spectrum band is half of a second power amplifier limit for the second radio frequency spectrum band, the UE 115-*b* may assign one third of a total transmit power limit for the uplink transmission power criterion to the first radio frequency spectrum band, and the UE 115-*b* may assign two thirds of the total transmit power limit for the uplink transmission power criterion to the second radio frequency spectrum band. In some cases, the UE 115-*b* may perform an equal power scaling across the configured radio frequency spectrum bands.

At 615, the UE 115-*b* may transmit the first uplink message via the first radio frequency spectrum band at the first transmission power level, or the second uplink message via the second radio frequency spectrum band at the second transmission power level, or both. In some cases, the UE 115-*b* may drop transmission of the first uplink message or the second uplink message to satisfy the uplink transmission power criterion based on the power scaling. For example, the UE 115-*b* may reduce the transmit power on uplink carriers of the second radio frequency spectrum band to zero (e.g., dropping the transmission), and the UE 115-*b* may transmit the first uplink message at the first transmission power level.

Figure 7:
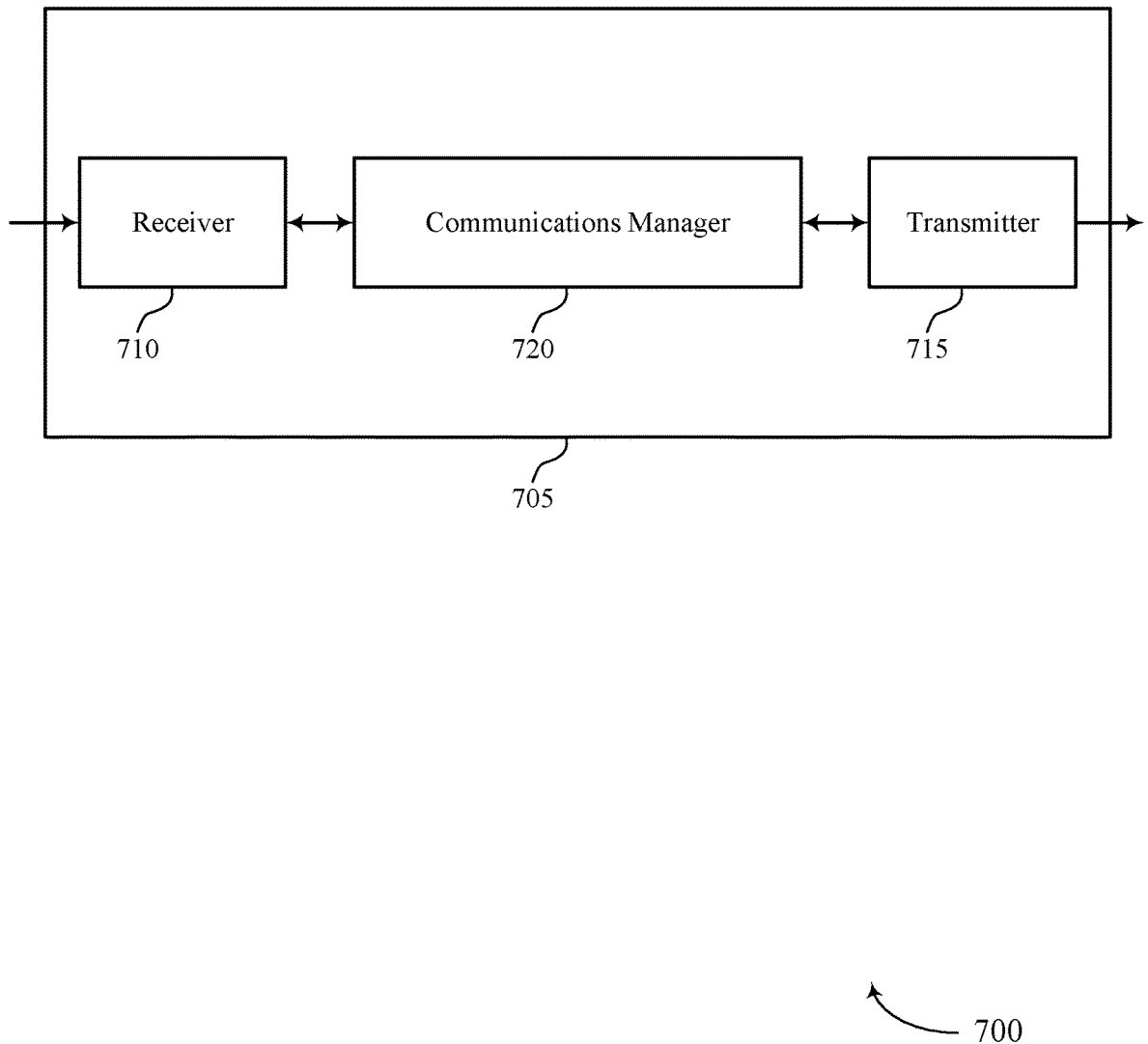
FIGS. 7 and 8 show block diagrams of devices that support power scaling for dynamic power aggregation in accordance with aspects of the present disclosure.

FIG. 7 shows a block diagram 700 of a device 705 that supports power scaling for dynamic power aggregation in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power scaling for dynamic power aggregation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power scaling for dynamic power aggregation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of power scaling for dynamic power aggregation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a base station, control signaling that schedules uplink transmission of a first uplink message via a first radio frequency spectrum band and a second uplink message via a second radio frequency spectrum band. The communications manager 720 may be configured as or otherwise support a means for selecting, to satisfy an uplink transmission power criterion, a first transmission power level for transmission via the first radio frequency spectrum band and a second transmission power level for transmission via the second radio frequency spectrum band based on a function of UE transmission power over a preceding time interval. The communications manager 720 may be configured as or otherwise support a means for transmitting the first uplink message via the first radio frequency spectrum band at the first transmission power level, or the second uplink message via the second radio frequency spectrum band at the second transmission power level, or both.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for improved power efficiency for uplink transmissions.

Figure 8:
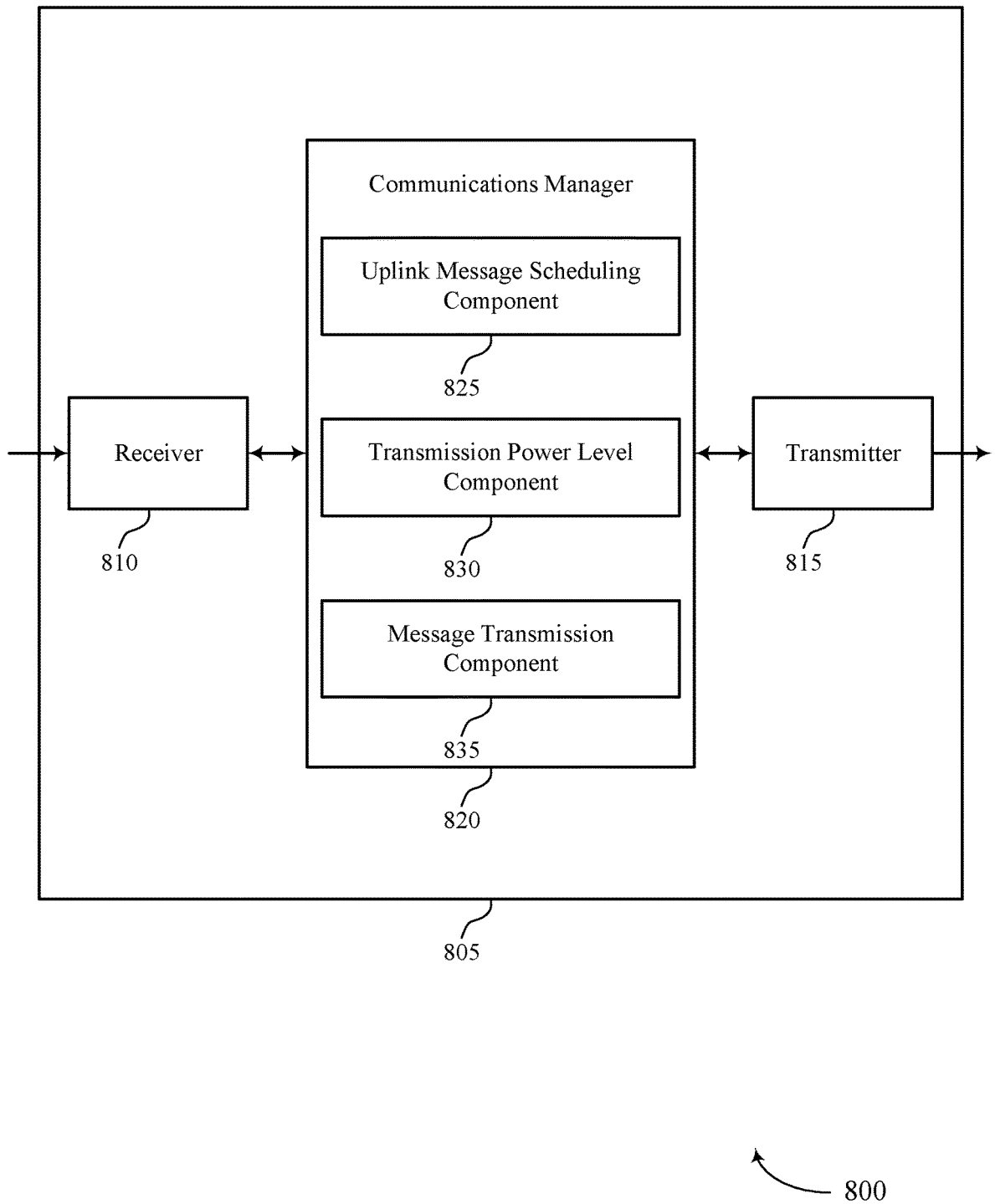

FIG. 8 shows a block diagram 800 of a device 805 that supports power scaling for dynamic power aggregation in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to power scaling for dynamic power aggregation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to power scaling for dynamic power aggregation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of power scaling for dynamic power aggregation as described herein. For example, the communications manager 820 may include an uplink message scheduling component 825, a transmission power level component 830, a message transmission component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The uplink message scheduling component 825 may be configured as or otherwise support a means for receiving, from a base station, control signaling that schedules uplink transmission of a first uplink message via a first radio frequency spectrum band and a second uplink message via a second radio frequency spectrum band. The transmission power level component 830 may be configured as or otherwise support a means for selecting, to satisfy an uplink transmission power criterion, a first transmission power level for transmission via the first radio frequency spectrum band and a second transmission power level for transmission via the second radio frequency spectrum band based on a function of UE transmission power over a preceding time interval. The message transmission component 835 may be configured as or otherwise support a means for transmitting the first uplink message via the first radio frequency spectrum band at the first transmission power level, or the second uplink message via the second radio frequency spectrum band at the second transmission power level, or both.

Figure 9:
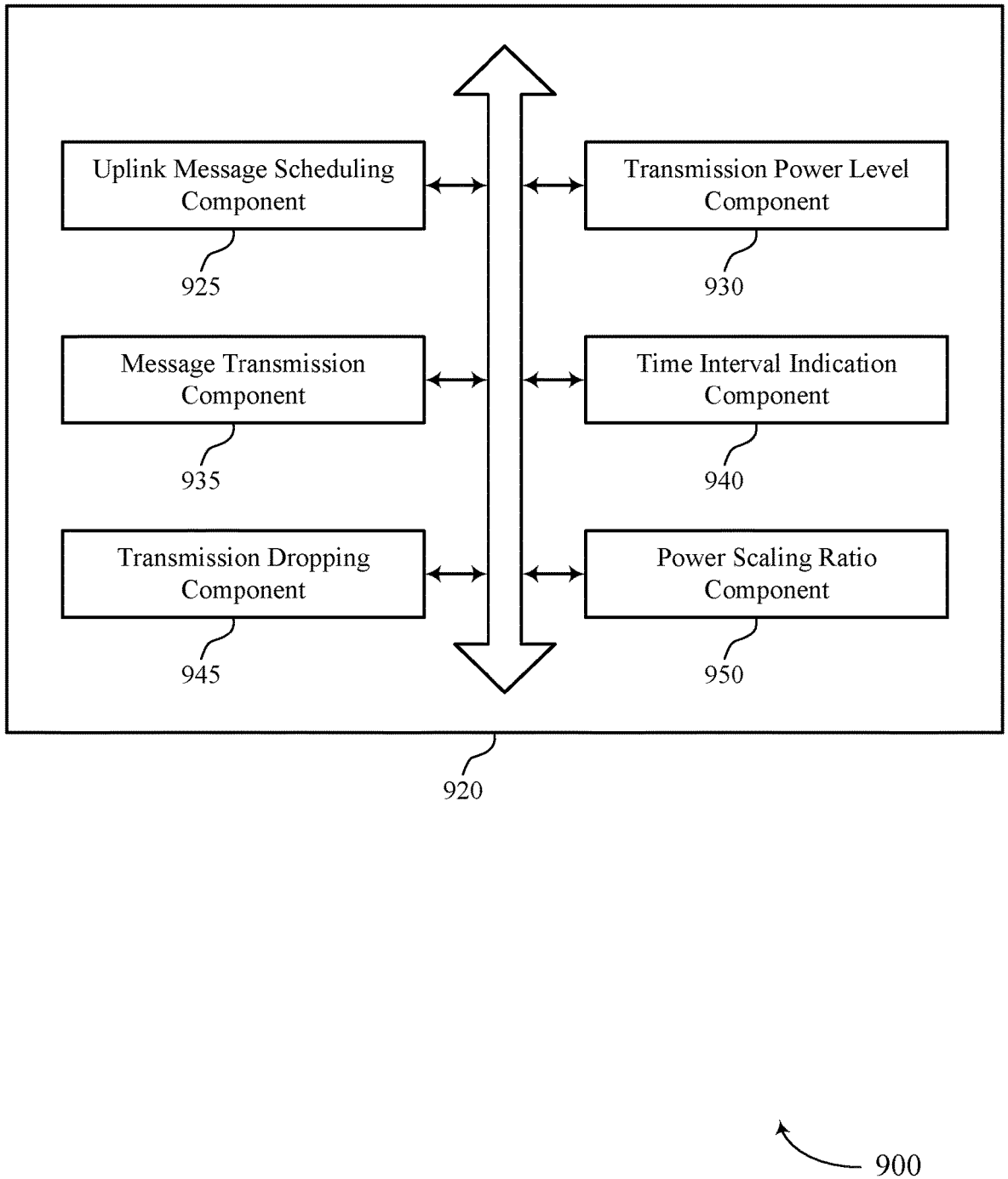
FIG. 9 shows a block diagram of a communications manager that supports power scaling for dynamic power aggregation in accordance with aspects of the present disclosure.

FIG. 9 shows a block diagram 900 of a communications manager 920 that supports power scaling for dynamic power aggregation in accordance with aspects of the present disclosure. The communications manager 920 may be an example of aspects of a communications manager 720, a communications manager 820, or both, as described herein.

The communications manager 920, or various components thereof, may be an example of means for performing various aspects of power scaling for dynamic power aggregation as described herein. For example, the communications manager 920 may include an uplink message scheduling component 925, a transmission power level component 930, a message transmission component 935, a time interval indication component 940, a transmission dropping component 945, a power scaling ratio component 950, or any combination thereof. Each of these components may communicate, directly or indirectly, with one another (e.g., via one or more buses).

The communications manager 920 may support wireless communications at a UE in accordance with examples as disclosed herein. The uplink message scheduling component 925 may be configured as or otherwise support a means for receiving, from a base station, control signaling that schedules uplink transmission of a first uplink message via a first radio frequency spectrum band and a second uplink message via a second radio frequency spectrum band. The transmission power level component 930 may be configured as or otherwise support a means for selecting, to satisfy an uplink transmission power criterion, a first transmission power level for transmission via the first radio frequency spectrum band and a second transmission power level for transmission via the second radio frequency spectrum band based on a function of UE transmission power over a preceding time interval. The message transmission component 935 may be configured as or otherwise support a means for transmitting the first uplink message via the first radio frequency spectrum band at the first transmission power level, or the second uplink message via the second radio frequency spectrum band at the second transmission power level, or both.

In some examples, to support selecting, the transmission power level component 930 may be configured as or otherwise support a means for selecting the first transmission power level based on the first radio frequency spectrum band having a higher priority than the second radio frequency spectrum band. In some examples, to support selecting, the transmission power level component 930 may be configured as or otherwise support a means for selecting the second transmission power level based on the first transmission power level, where a sum of the first transmission power level and the second transmission power level satisfies the uplink transmission power criterion.

In some examples, the uplink transmission power criterion is a threshold statistical transmission power permitted over the preceding time interval. In some examples, the preceding time interval corresponds to a symbol period, a transmission occasion within a slot, or a transmission occasion over a set of multiple slots.

In some examples, the first transmission power level is selected to satisfy a first transmission power limit for the first radio frequency spectrum band and the second transmission power level is selected to satisfy a second transmission power limit for the second radio frequency spectrum band.

In some examples, the first transmission power limit is determined prior to the second transmission power limit based on the first radio frequency spectrum band having a higher priority than the second radio frequency spectrum band.

In some examples, the first radio frequency spectrum band has the higher priority based on carrier frequencies, bandwidths, subcarrier spacing configurations, cyclic prefix configurations, power classes, or any combination thereof, of at least a first uplink carriers in the first radio frequency spectrum band and at least a second uplink carriers in the second radio frequency spectrum band.

In some examples, the first radio frequency spectrum band has the higher priority based on the first radio frequency spectrum band corresponding to a primary cell and the second radio frequency spectrum band not corresponding to the primary cell.

In some examples, the first radio frequency spectrum band has the higher priority based on message content priorities, channel priorities, channel types, or any combination thereof, associated with the first uplink message transmitted on at least a first uplink carriers of the first radio frequency spectrum band and the second uplink message transmitted on at least a second uplink carriers of the second radio frequency spectrum band.

In some examples, the transmission dropping component 945 may be configured as or otherwise support a means for dropping transmission of the second uplink message based on setting the second transmission power limit for the second radio frequency spectrum band to zero.

In some examples, the power scaling ratio component 950 may be configured as or otherwise support a means for receiving control signaling indicating a power scaling ratio for performing power scaling between a first transmission power sum for the first radio frequency spectrum band and a second transmission power sum for the second radio frequency spectrum band, where the first transmission power limit and the second transmission power limit are based on the power scaling ratio.

In some examples, the power scaling ratio indicates equal power scaling between the first transmission power sum for the first radio frequency spectrum band and the second transmission power sum for the second radio frequency spectrum band.

In some examples, the time interval indication component 940 may be configured as or otherwise support a means for receiving, from the base station, an indication of a duration of the preceding time interval via downlink control information, a medium access control (MAC) control element (CE), RRC signaling, or any combination thereof.

In some examples, the transmission power level component 930 may be configured as or otherwise support a means for receiving control signaling indicating a first transmission power limit for the first radio frequency spectrum band and a second transmission power limit for the second radio frequency spectrum band.

In some examples, to support transmitting, the message transmission component 935 may be configured as or otherwise support a means for transmitting the first uplink message at the first transmission power level that satisfies the first transmission power limit and the second uplink message at the second transmission power level that satisfies the second transmission power limit, where the first transmission power level and the second transmission power level satisfy the uplink transmission power criterion.

In some examples, the uplink message scheduling component 925 may be configured as or otherwise support a means for receiving, from the base station, the control signaling that schedules uplink transmission of a third uplink message via a third radio frequency spectrum band. In some examples, the transmission power level component 930 may be configured as or otherwise support a means for selecting, to satisfy the uplink transmission power criterion, a third transmission power level for transmission via the third radio frequency spectrum band based on the function of the UE transmission power over the preceding time interval, where the first transmission power level, the second transmission power level, and the third transmission power level satisfy the uplink transmission power criterion. In some examples, the message transmission component 935 may be configured as or otherwise support a means for transmitting the third uplink message via the third radio frequency spectrum band at the third transmission power level.

In some examples, to support receiving the control signaling, the transmission power level component 930 may be configured as or otherwise support a means for receiving, from the base station, the control signaling that schedules uplink transmission in a subset of a set of multiple radio frequency spectrum bands, where transmission power levels of the UE for the subset of the set of multiple radio frequency spectrum bands satisfy the uplink transmission power criterion.

In some examples, the first radio frequency spectrum band and the second radio frequency spectrum band are configured for a carrier aggregation configuration or a dual connectivity configuration, or both.

In some examples, the uplink transmission power criterion corresponds to a specific absorption rate.

Figure 10:
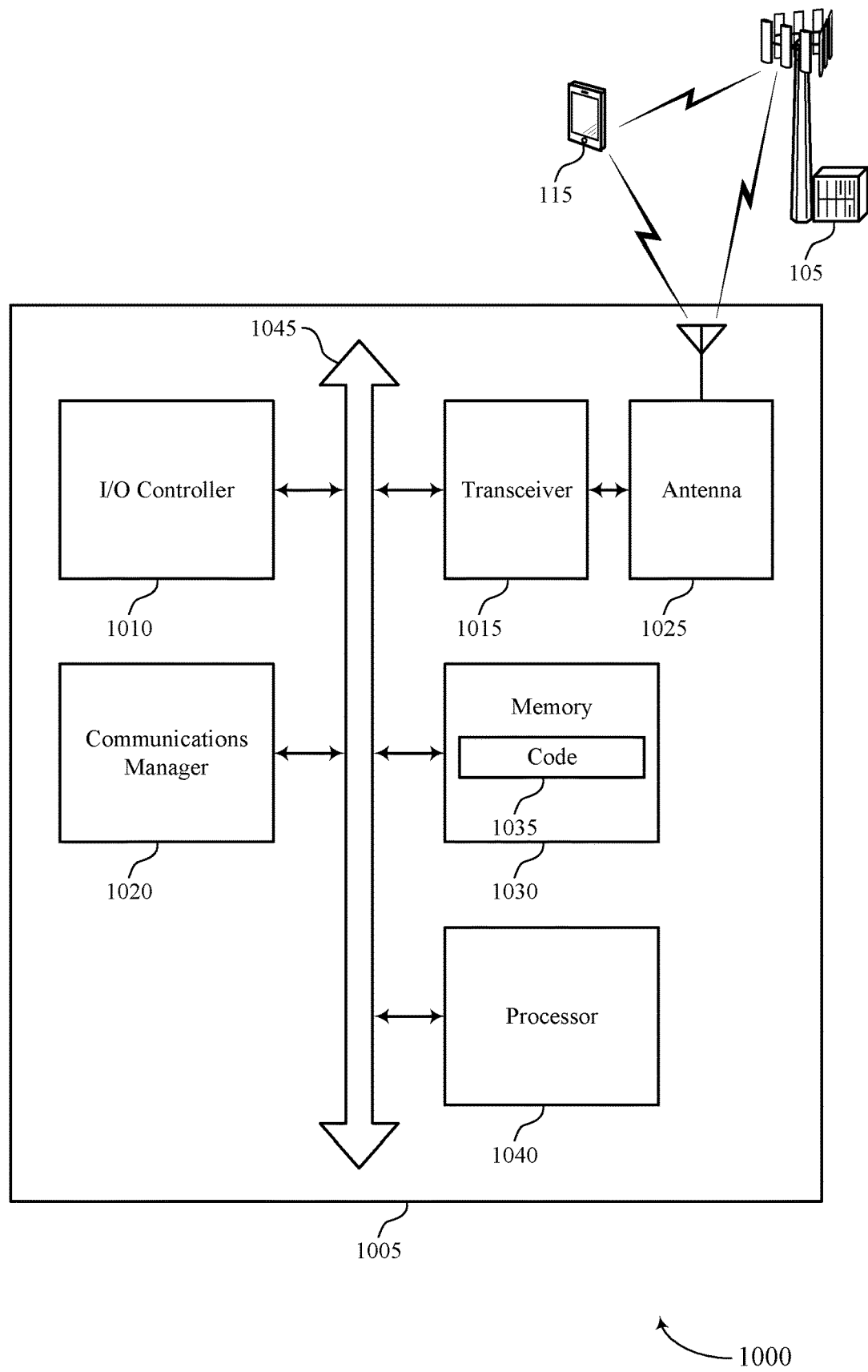
FIG. 10 shows a diagram of a system including a device that supports power scaling for dynamic power aggregation in accordance with aspects of the present disclosure.

FIG. 10 shows a diagram of a system 1000 including a device 1005 that supports power scaling for dynamic power aggregation in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025.

The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power scaling for dynamic power aggregation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a base station, control signaling that schedules uplink transmission of a first uplink message via a first radio frequency spectrum band and a second uplink message via a second radio frequency spectrum band. The communications manager 1020 may be configured as or otherwise support a means for selecting, to satisfy an uplink transmission power criterion, a first transmission power level for transmission via the first radio frequency spectrum band and a second transmission power level for transmission via the second radio frequency spectrum band based on a function of UE transmission power over a preceding time interval. The communications manager 1020 may be configured as or otherwise support a means for transmitting the first uplink message via the first radio frequency spectrum band at the first transmission power level, or the second uplink message via the second radio frequency spectrum band at the second transmission power level, or both.

By including or configuring the communications manager 1020 in accordance with examples as described herein, the device 1005 may support techniques for improved uplink peak data rates and corresponding increased uplink user perceived throughput.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of power scaling for dynamic power aggregation as described herein, or the processor 1040 and the memory 1030 may be otherwise configured to perform or support such operations.

Figure 11:
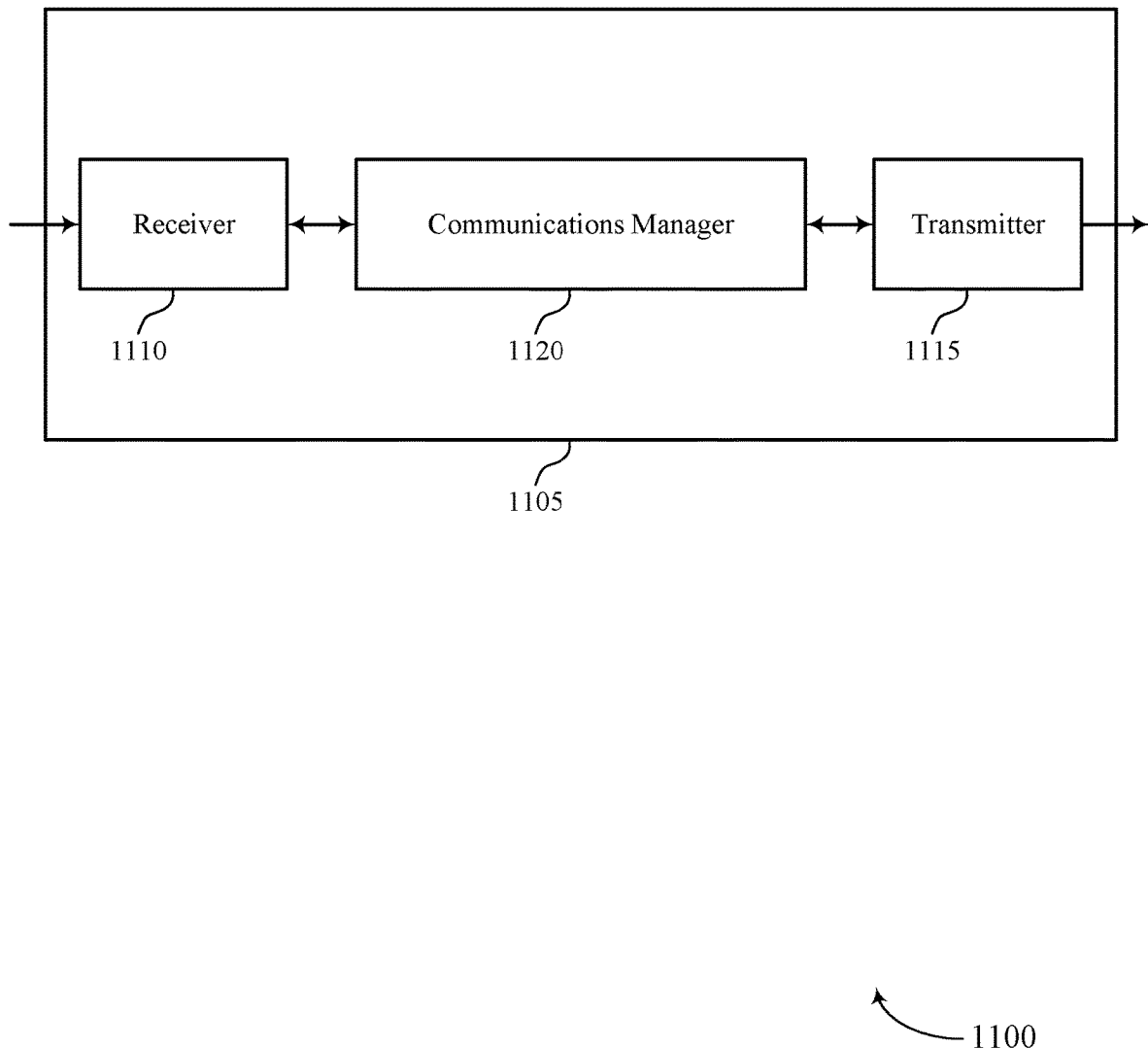
FIGS. 11 and 12 show block diagrams of devices that support power scaling for dynamic power aggregation in accordance with aspects of the present disclosure.

FIG. 11 shows a block diagram 1100 of a device 1105 that supports power scaling for dynamic power aggregation in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power scaling for dynamic power aggregation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power scaling for dynamic power aggregation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of power scaling for dynamic power aggregation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, control signaling that schedules uplink transmission of a first uplink message via a first radio frequency spectrum band and a second uplink message via a second radio frequency spectrum band. The communications manager 1120 may be configured as or otherwise support a means for transmitting a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion. The communications manager 1120 may be configured as or otherwise support a means for monitoring for the first uplink message via the first radio frequency spectrum band communicated at the first transmission power level, or the second uplink message via the second radio frequency spectrum band communicated at the second transmission power level, or both.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for enhanced uplink power efficiency.

Figure 12:
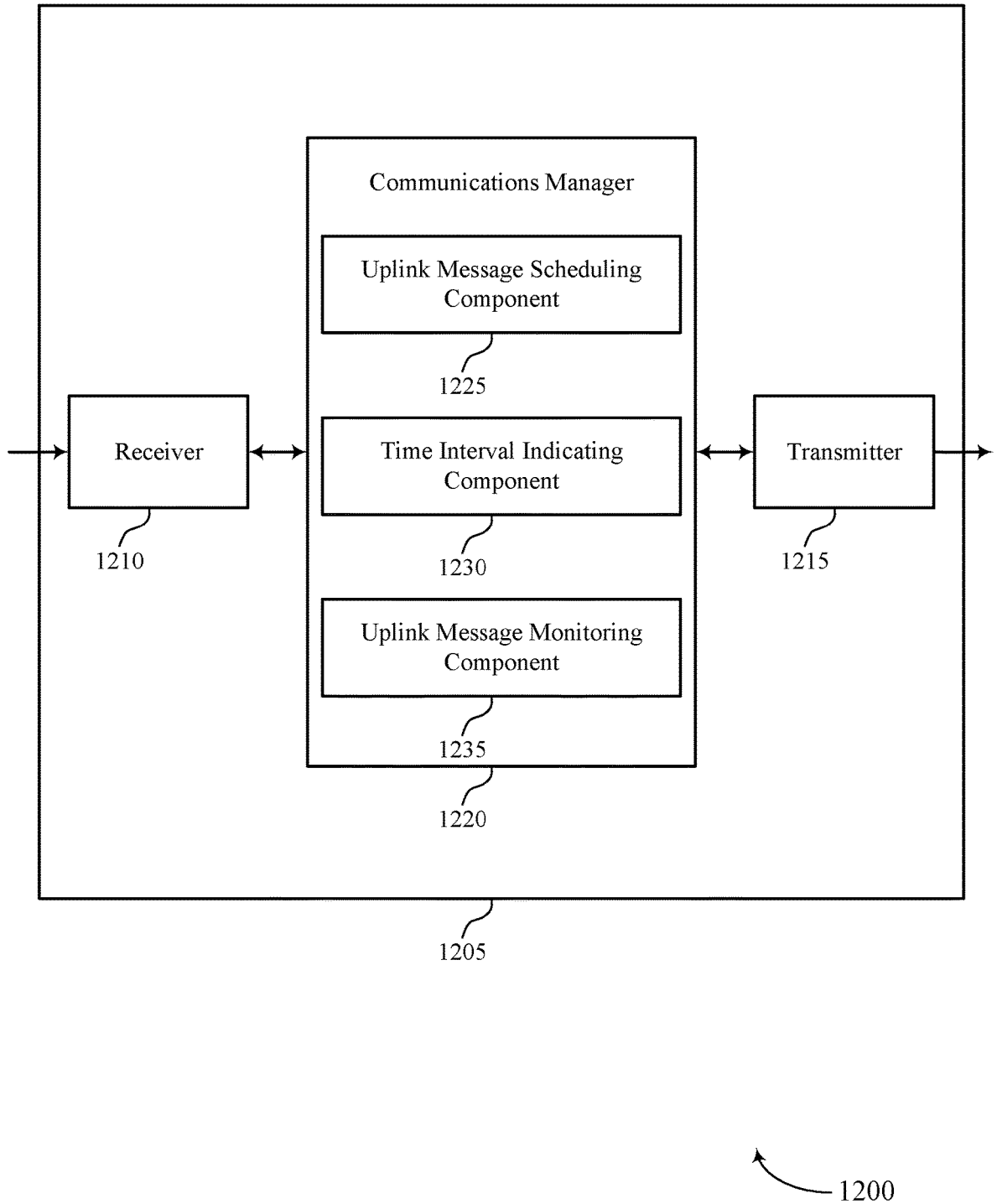

FIG. 12 shows a block diagram 1200 of a device 1205 that supports power scaling for dynamic power aggregation in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to power scaling for dynamic power aggregation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to power scaling for dynamic power aggregation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of power scaling for dynamic power aggregation as described herein. For example, the communications manager 1220 may include an uplink message scheduling component 1225, a time interval indicating component 1230, an uplink message monitoring component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The uplink message scheduling component 1225 may be configured as or otherwise support a means for transmitting, to a UE, control signaling that schedules uplink transmission of a first uplink message via a first radio frequency spectrum band and a second uplink message via a second radio frequency spectrum band. The time interval indicating component 1230 may be configured as or otherwise support a means for transmitting a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion. The uplink message monitoring component 1235 may be configured as or otherwise support a means for monitoring for the first uplink message via the first radio frequency spectrum band communicated at the first transmission power level, or the second uplink message via the second radio frequency spectrum band communicated at the second transmission power level, or both.

Figure 13:
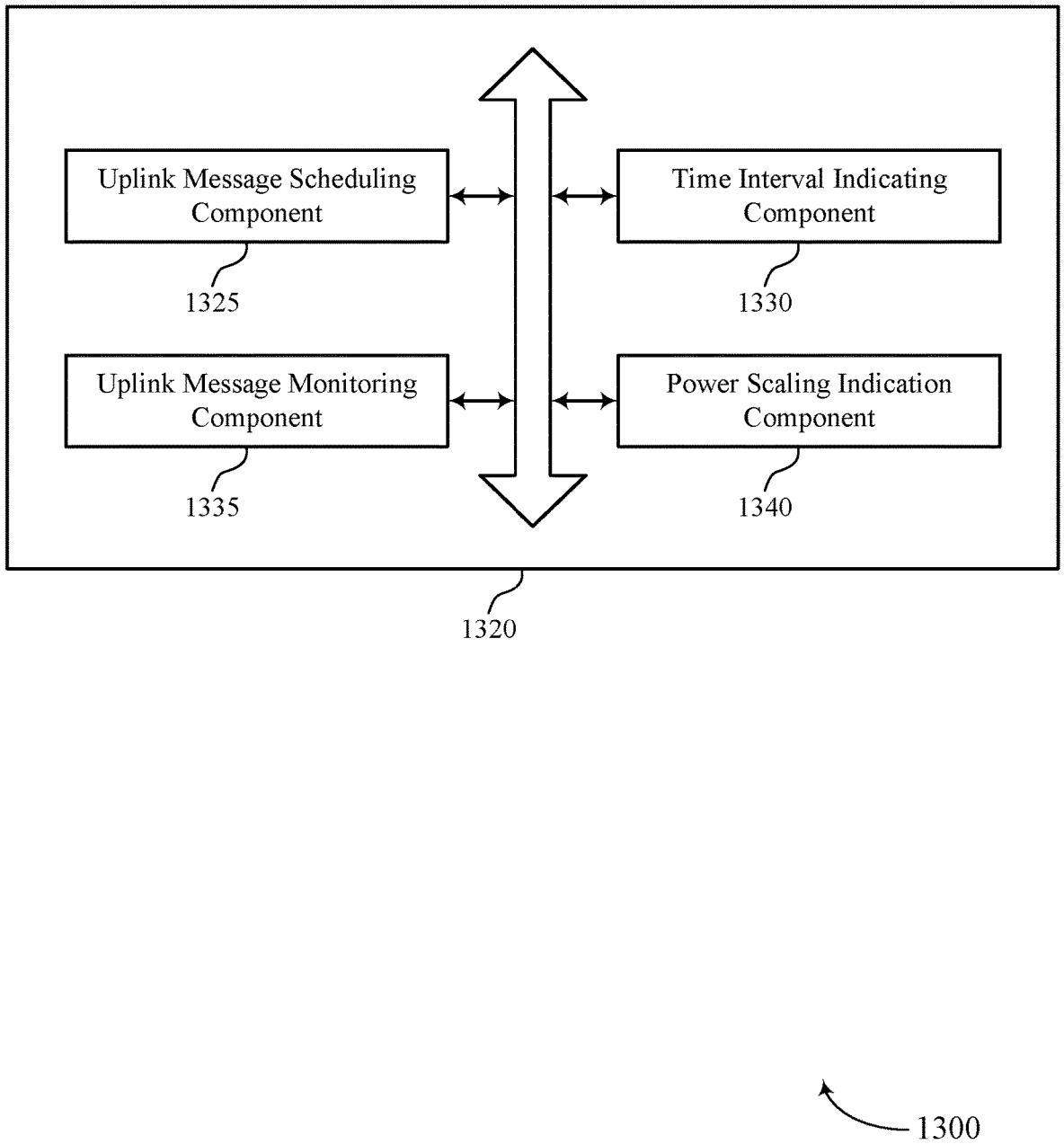
FIG. 13 shows a block diagram of a communications manager that supports power scaling for dynamic power aggregation in accordance with aspects of the present disclosure.

FIG. 13 shows a block diagram 1300 of a communications manager 1320 that supports power scaling for dynamic power aggregation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of power scaling for dynamic power aggregation as described herein. For example, the communications manager 1320 may include an uplink message scheduling component 1325, a time interval indicating component 1330, an uplink message monitoring component 1335, a power scaling indication component 1340, or any combination thereof. Each of these components may communicate, directly or indirectly, with one another (e.g., via one or more buses).

The communications manager 1320 may support wireless communications at a base station in accordance with examples as disclosed herein. The uplink message scheduling component 1325 may be configured as or otherwise support a means for transmitting, to a UE, control signaling that schedules uplink transmission of a first uplink message via a first radio frequency spectrum band and a second uplink message via a second radio frequency spectrum band. The time interval indicating component 1330 may be configured as or otherwise support a means for transmitting a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion. The uplink message monitoring component 1335 may be configured as or otherwise support a means for monitoring for the first uplink message via the first radio frequency spectrum band communicated at the first transmission power level, or the second uplink message via the second radio frequency spectrum band communicated at the second transmission power level, or both.

In some examples, to support transmitting the control message, the time interval indicating component 1330 may be configured as or otherwise support a means for transmitting the control message via downlink control information, a medium access control (MAC) control element (CE), RRC signaling, or any combination thereof.

In some examples, the power scaling indication component 1340 may be configured as or otherwise support a means for transmitting control signaling indicating a power scaling ratio for the UE to perform power scaling between a first transmission power sum for the first radio frequency spectrum band and a second transmission power sum for the second radio frequency spectrum band, where a first transmission power limit and a second transmission power limit are based on the power scaling ratio.

In some examples, the power scaling ratio indicates equal power scaling between the first transmission power sum for the first radio frequency spectrum band and the second transmission power sum for the second radio frequency spectrum band.

In some examples, the uplink message scheduling component 1325 may be configured as or otherwise support a means for transmitting, to the UE, the control message that schedules uplink transmission of a third uplink message via a third radio frequency spectrum band, where the first transmission power level, the second transmission power level, and a third transmission power level for transmission via the third radio frequency spectrum band satisfy the uplink transmission power criterion. In some examples, the uplink message monitoring component 1335 may be configured as or otherwise support a means for monitoring for the third uplink message via the third radio frequency spectrum band.

In some examples, to support transmitting the control message, the uplink message scheduling component 1325 may be configured as or otherwise support a means for transmitting, to the UE, the control message that schedules uplink transmission in a subset of a set of multiple radio frequency spectrum bands, where transmission power levels of the UE for the subset of the set of multiple radio frequency spectrum bands satisfy the uplink transmission power criterion.

In some examples, the first radio frequency spectrum band and the second radio frequency spectrum band are configured for a carrier aggregation configuration or a dual connectivity configuration, or both.

In some examples, the uplink transmission power criterion corresponds to a specific absorption rate.

Figure 14:
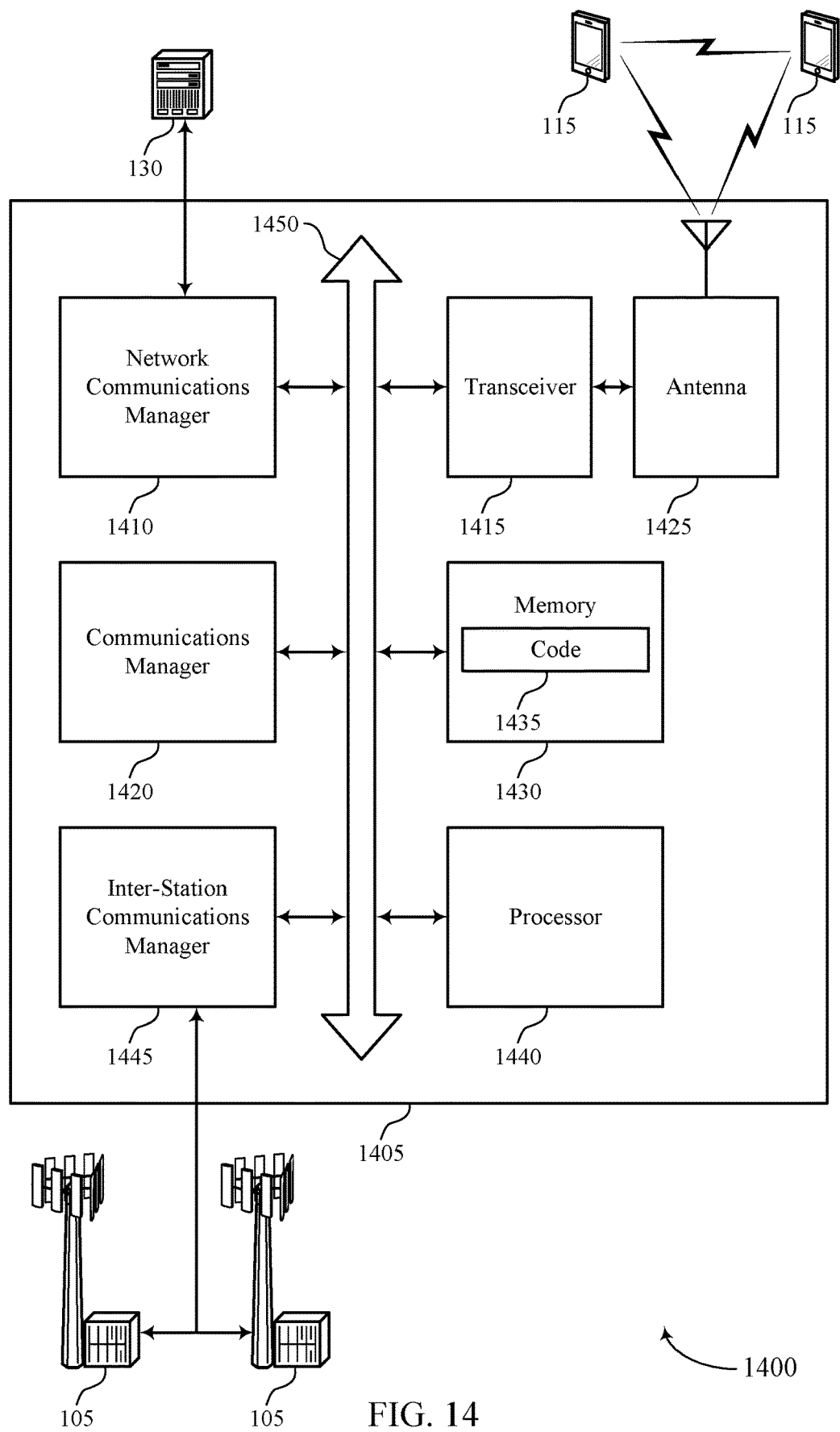
FIG. 14 shows a diagram of a system including a device that supports power scaling for dynamic power aggregation in accordance with aspects of the present disclosure.

FIG. 14 shows a diagram of a system 1400 including a device 1405 that supports power scaling for dynamic power aggregation in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting power scaling for dynamic power aggregation). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, control signaling that schedules uplink transmission of a first uplink message via a first radio frequency spectrum band and a second uplink message via a second radio frequency spectrum band. The communications manager 1420 may be configured as or otherwise support a means for transmitting a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion. The communications manager 1420 may be configured as or otherwise support a means for monitoring for the first uplink message via the first radio frequency spectrum band communicated at the first transmission power level, or the second uplink message via the second radio frequency spectrum band communicated at the second transmission power level, or both.

By including or configuring the communications manager 1420 in accordance with examples as described herein, the device 1405 may support techniques for improved uplink peak data rates and corresponding increased uplink user perceived throughput.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor

1440, the memory 1430, the code 1435, or any combination thereof. For example, the code 1435 may include instructions executable by the processor 1440 to cause the device 1405 to perform various aspects of power scaling for dynamic power aggregation as described herein, or the processor 1440 and the memory 1430 may be otherwise configured to perform or support such operations.

Figure 15:
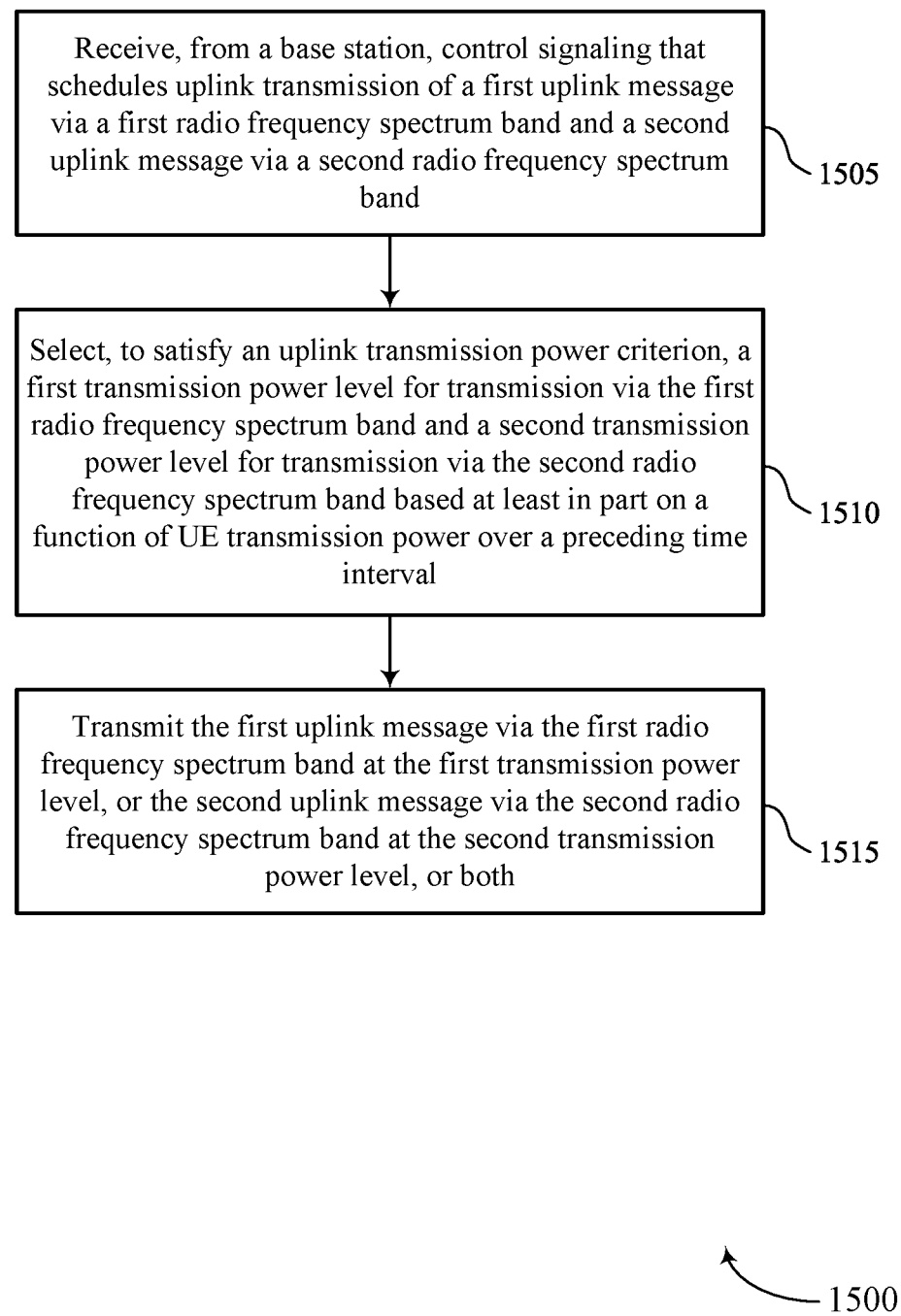
FIGS. 15 through 18 show flowcharts illustrating methods that support power scaling for dynamic power aggregation in accordance with aspects of the present disclosure.

FIG. 15 shows a flowchart illustrating a method 1500 that supports power scaling for dynamic power aggregation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling that schedules uplink transmission of a first uplink message via a first radio frequency spectrum band and a second uplink message via a second radio frequency spectrum band. The operations of 1505 may be performed in accordance with examples as disclosed herein. In some examples, aspects of the operations of 1505 may be performed by an uplink message scheduling component 925 as described with reference to FIG. 9.

At 1510, the method may include selecting, to satisfy an uplink transmission power criterion, a first transmission power level for transmission via the first radio frequency spectrum band and a second transmission power level for transmission via the second radio frequency spectrum band based on a function of UE transmission power over a preceding time interval. The operations of 1510 may be performed in accordance with examples as disclosed herein. In some examples, aspects of the operations of 1510 may be performed by a transmission power level component 930 as described with reference to FIG. 9.

At 1515, the method may include transmitting the first uplink message via the first radio frequency spectrum band at the first transmission power level, or the second uplink message via the second radio frequency spectrum band at the second transmission power level, or both. The operations of 1515 may be performed in accordance with examples as disclosed herein. In some examples, aspects of the operations of 1515 may be performed by a message transmission component 935 as described with reference to FIG. 9.

Figure 16:
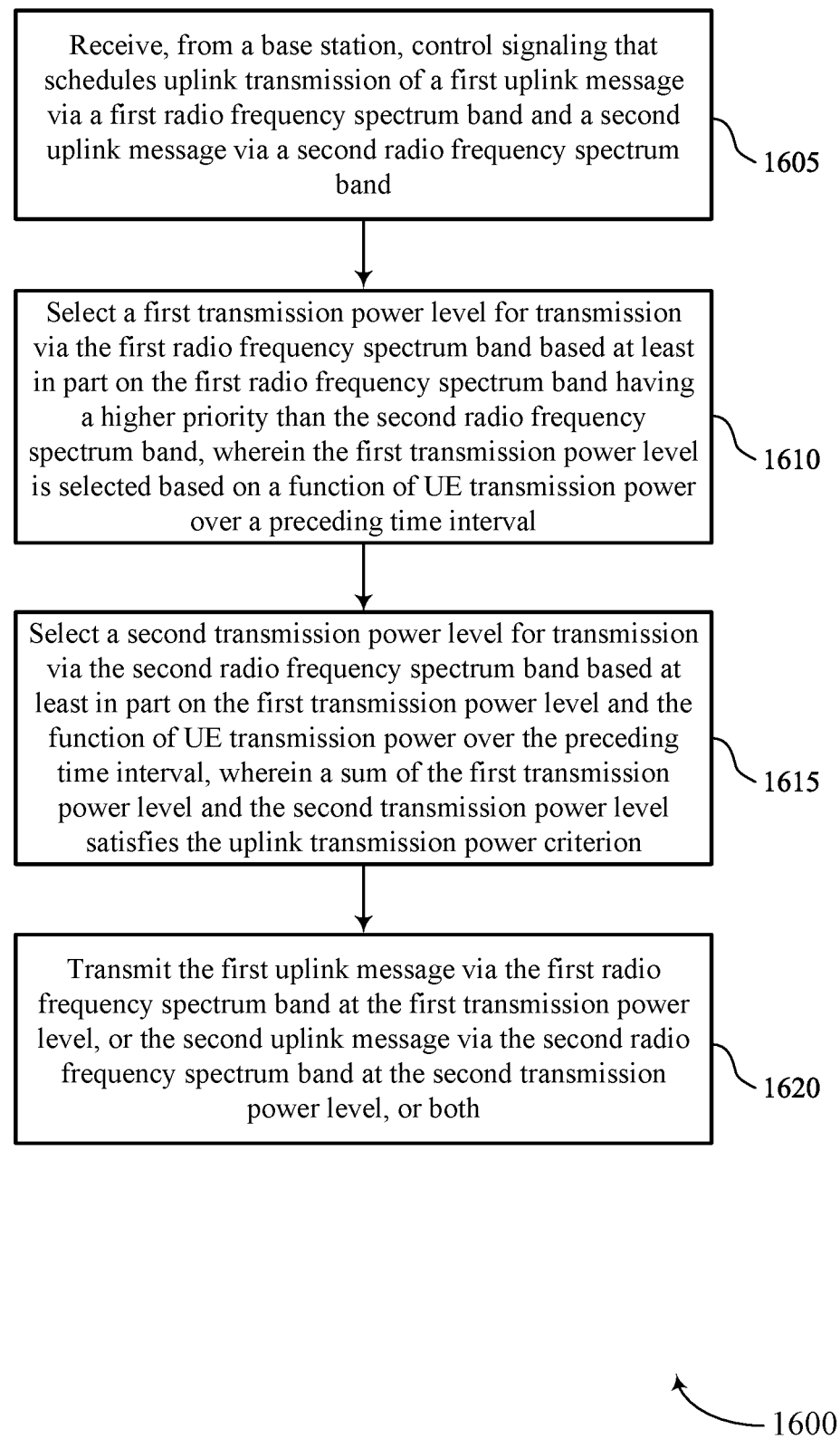

FIG. 16 shows a flowchart illustrating a method 1600 that supports power scaling for dynamic power aggregation in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling that schedules uplink transmission of a first uplink message via a first radio frequency spectrum band and a second uplink message via a second radio frequency spectrum band. The operations of 1605 may be performed in accordance with examples as disclosed herein. In some examples, aspects of the operations of 1605 may be performed by an uplink message scheduling component 925 as described with reference to FIG. 9.

At 1610, the method may include selecting a first transmission power level for transmission via the first radio frequency spectrum band based on the first radio frequency spectrum band having a higher priority than the second radio frequency spectrum band, where the first transmission power level is selected based on a function of UE transmission power over a preceding time interval. The operations of 1610 may be performed in accordance with examples as disclosed herein. In some examples, aspects of the operations of 1610 may be performed by a transmission power level component 930 as described with reference to FIG. 9.

At 1615, the method may include selecting a second transmission power level for transmission via the second radio frequency spectrum band based on the first transmission power level and the function of UE transmission power over the preceding time interval, where a sum of the first transmission power level and the second transmission power level satisfies the uplink transmission power criterion. The operations of 1615 may be performed in accordance with examples as disclosed herein. In some examples, aspects of the operations of 1615 may be performed by a transmission power level component 930 as described with reference to FIG. 9.

At 1620, the method may include selecting, to satisfy an uplink transmission power criterion, a first transmission power level for transmission via the first radio frequency spectrum band and a second transmission power level for transmission via the second radio frequency spectrum band based on a function of UE transmission power over a preceding time interval. The operations of 1620 may be performed in accordance with examples as disclosed herein. In some examples, aspects of the operations of 1620 may be performed by a transmission power level component 930 as described with reference to FIG. 9.

At 1625, the method may include transmitting the first uplink message via the first radio frequency spectrum band at the first transmission power level, or the second uplink message via the second radio frequency spectrum band at the second transmission power level, or both. The operations of 1625 may be performed in accordance with examples as disclosed herein. In some examples, aspects of the operations of 1625 may be performed by a message transmission component 935 as described with reference to FIG. 9.

Figure 17:
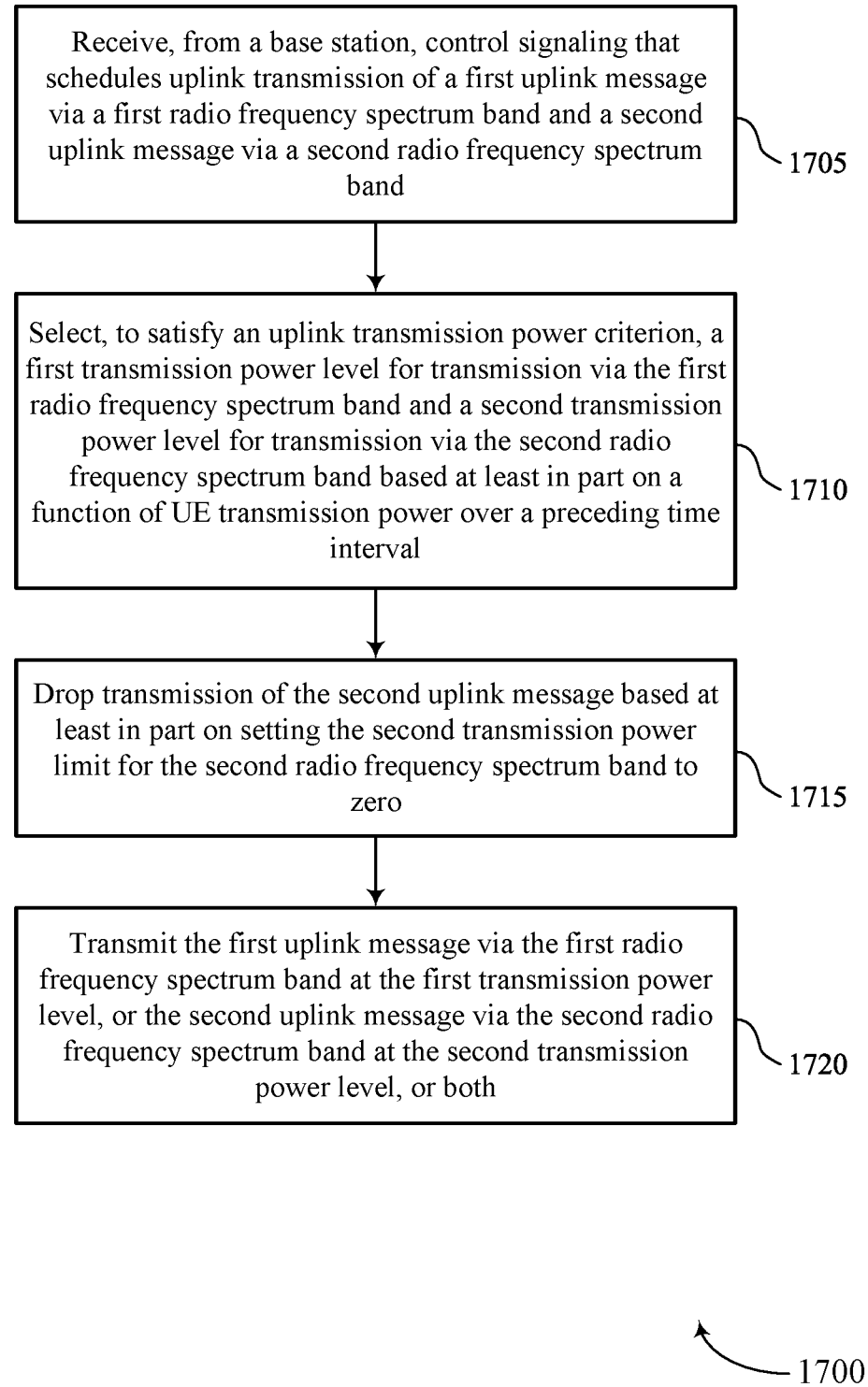

FIG. 17 shows a flowchart illustrating a method 1700 that supports power scaling for dynamic power aggregation in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling that schedules uplink transmission of a first uplink message via a first radio frequency spectrum band and a second uplink message via a second radio frequency spectrum band. The operations of 1705 may be performed in accordance with examples as disclosed herein. In some examples, aspects of the operations of 1705 may be performed by an uplink message scheduling component 925 as described with reference to FIG. 9.

At 1710, the method may include selecting, to satisfy an uplink transmission power criterion, a first transmission power level for transmission via the first radio frequency spectrum band and a second transmission power level for transmission via the second radio frequency spectrum band based on a function of UE transmission power over a preceding time interval. The operations of 1710 may be performed in accordance with examples as disclosed herein. In some examples, aspects of the operations of 1710 may be performed by a transmission power level component 930 as described with reference to FIG. 9.

At 1715, the method may include dropping transmission of the second uplink message based on setting the second transmission power limit for the second radio frequency spectrum band to zero. The operations of 1715 may be performed in accordance with examples as disclosed herein. In some examples, aspects of the operations of 1715 may be performed by a transmission dropping component 945 as described with reference to FIG. 9.

At 1720, the method may include transmitting the first uplink message via the first radio frequency spectrum band at the first transmission power level, or the second uplink message via the second radio frequency spectrum band at the second transmission power level, or both. The operations of 1720 may be performed in accordance with examples as disclosed herein. In some examples, aspects of the operations of 1720 may be performed by a message transmission component 935 as described with reference to FIG. 9.

Figure 18:
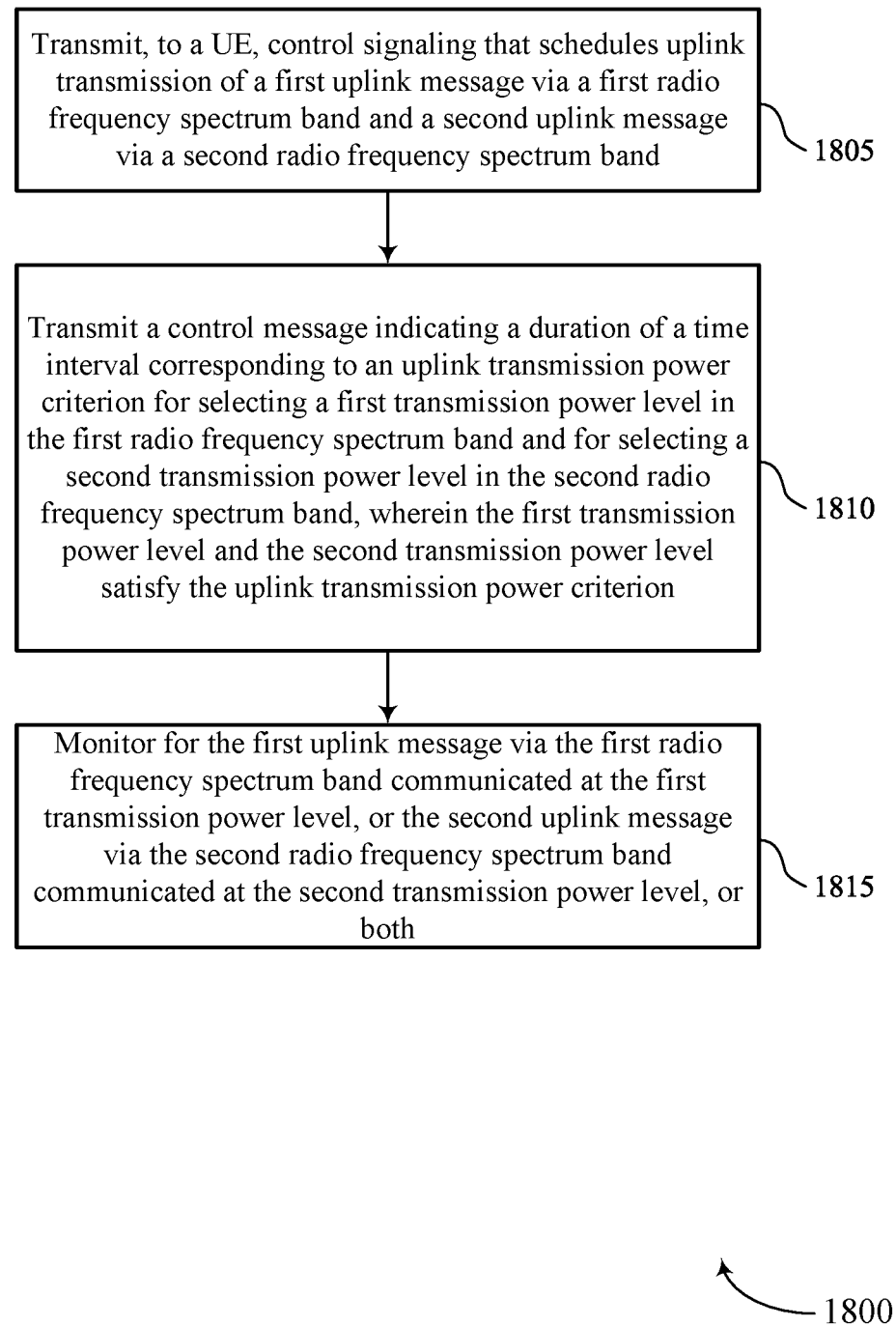

FIG. 18 shows a flowchart illustrating a method 1800 that supports power scaling for dynamic power aggregation in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling that schedules uplink transmission of a first uplink message via a first radio frequency spectrum band and a second uplink message via a second radio frequency spectrum band. The operations of 1805 may be performed in accordance with examples as disclosed herein. In some examples, aspects of the operations of 1805 may be performed by an uplink message scheduling component 1325 as described with reference to FIG. 13.

At 1810, the method may include transmitting a control message indicating a duration of a time interval corresponding to an uplink transmission power criterion for selecting a first transmission power level in the first radio frequency spectrum band and for selecting a second transmission power level in the second radio frequency spectrum band, where the first transmission power level and the second transmission power level satisfy the uplink transmission power criterion. The operations of 1810 may be performed in accordance with examples as disclosed herein. In some examples, aspects of the operations of 1810 may be performed by a time interval indicating component 1330 as described with reference to FIG. 13.

At 1815, the method may include monitoring for the first uplink message via the first radio frequency spectrum band communicated at the first transmission power level, or the second uplink message via the second radio frequency spectrum band communicated at the second transmission power level, or both. The operations of 1815 may be performed in accordance with examples as disclosed herein. In some examples, aspects of the operations of 1815 may be performed by an uplink message monitoring component 1335 as described with reference to FIG. 13.

The following provides an overview of aspects of the present disclosure:

Aspect 1: A method for wireless communications at a UE, comprising: receiving, from a base station, control signaling that schedules uplink transmission of a first uplink message via a first radio frequency spectrum band and a second uplink message via a second radio frequency spectrum band; selecting, to satisfy an uplink transmission power criterion, a first transmission power level for transmission via the first radio frequency spectrum band and a second transmission power level for transmission via the second radio frequency spectrum band based at least in part on a function of UE transmission power over a preceding time interval; and transmitting the first uplink message via the first radio frequency spectrum band at the first transmission power level, or the second uplink message via the second radio frequency spectrum band at the second transmission power level, or both.

Aspect 2: The method of aspect 1, wherein the selecting comprises: selecting the first transmission power level based at least in part on the first radio frequency spectrum band having a higher priority than the second radio frequency spectrum band; and selecting the second transmission power level based at least in part on the first transmission power level, wherein a sum of the first transmission power level and the second transmission power level satisfies the uplink transmission power criterion.

Aspect 3: The method of any of aspects 1 through 2, wherein the uplink transmission power criterion is a threshold statistical transmission power permitted over the preceding time interval, the preceding time interval corresponds to a symbol period, a transmission occasion within a slot, or a transmission occasion over a plurality of slots.

Aspect 4: The method of any of aspects 1 through 3, wherein the first transmission power level is selected to satisfy a first transmission power limit for the first radio frequency spectrum band and the second transmission power level is selected to satisfy a second transmission power limit for the second radio frequency spectrum band.

Aspect 5: The method of aspect 4, wherein the first transmission power limit is determined prior to the second transmission power limit based at least in part on the first radio frequency spectrum band having a higher priority than the second radio frequency spectrum band.

Aspect 6: The method of aspect 5, wherein the first radio frequency spectrum band has the higher priority based at least in part on carrier frequencies, bandwidths, power classes, subcarrier spacing configurations, cyclic prefix configurations, power classes, or any combination thereof, of at least a first uplink carriers in the first radio frequency spectrum band and at least a second uplink carriers in the second radio frequency spectrum band.

Aspect 7: The method of any of aspects 5 through 6, wherein the first radio frequency spectrum band has the higher priority based at least in part on the first radio frequency spectrum band corresponding to a primary cell and the second radio frequency spectrum band not corresponding to the primary cell.

Aspect 8: The method of any of aspects 5 through 7, wherein the first radio frequency spectrum band has the higher priority based at least in part on message content priorities, channel priorities, channel types, or any combination thereof, associated with the first uplink message transmitted on at least a first uplink carrier of the first radio frequency spectrum band and the second uplink message transmitted on at least a second uplink carrier of the second radio frequency spectrum band.

Aspect 9: The method of any of aspects 4 through 8, further comprising: dropping transmission of the second uplink message based at least in part on setting the second transmission power limit for the second radio frequency spectrum band to zero.

Aspect 10: The method of any of aspects 4 through 9, further comprising: receiving control signaling indicating a power scaling ratio for performing power scaling between a first transmission power sum for the first radio frequency spectrum band and a second transmission power sum for the second radio frequency spectrum band, wherein the first transmission power limit and the second transmission power limit are based at least in part on the power scaling ratio.

Aspect 11: The method of aspect 10, wherein the power scaling ratio indicates equal power scaling between the first transmission power sum for the first radio frequency spectrum band and the second transmission power sum for the second radio frequency spectrum band.

Aspect 12: The method of any of aspects 1 through 11, further comprising: receiving, from the base station, an indication of a duration of the preceding time interval via downlink control information, a medium access control (MAC) control element (CE), RRC signaling, or any combination thereof.

Aspect 13: The method of any of aspects 1 through 12, further comprising: receiving control signaling indicating a first transmission power limit for the first radio frequency spectrum band and a second transmission power limit for the second radio frequency spectrum band.

Aspect 14: The method of aspect 13, wherein the transmitting comprises: transmitting the first uplink message at the first transmission power level that satisfies the first transmission power limit and the second uplink message at the second transmission power level that satisfies the second transmission power limit, wherein the first transmission power level and the second transmission power level satisfy the uplink transmission power criterion.

Aspect 15: The method of any of aspects 1 through 14, further comprising: receiving, from the base station, the control signaling that schedules uplink transmission of a third uplink message via a third radio frequency spectrum band; selecting, to satisfy the uplink transmission power criterion, a third transmission power level for transmission via the third radio frequency spectrum band based at least in part on the function of the UE transmission power over the preceding time interval, wherein the first transmission power level, the second transmission power level, and the third transmission power level satisfy the uplink transmission power criterion; and transmitting the third uplink message via the third radio frequency spectrum band at the third transmission power level.

Aspect 16: The method of any of aspects 1 through 15, wherein receiving the control signaling further comprises: receiving, from the base station, the control signaling that schedules uplink transmission in a subset of a plurality of radio frequency spectrum bands, wherein transmission power levels of the UE for the subset of the plurality of radio frequency spectrum bands satisfy the uplink transmission power criterion.

Aspect 17: The method of any of aspects 1 through 16, wherein the first radio frequency spectrum band and the second radio frequency spectrum band are configured for a carrier aggregation configuration or a dual connectivity configuration, or both.

Aspect 18: The method of any of aspects 1 through 17, wherein the uplink transmission power criterion corresponds to a specific absorption rate.

Aspect 19: A method for wireless communications at a base station, comprising: transmitting, to a UE, control signaling that schedules uplink transmission of a first uplink message via a first radio frequency spectrum band and a second uplink message via a second radio frequency spectrum band; transmitting a control message indicating a duration of a time interval corresponding to an uplink transmission power criterion for selecting a first transmission power level in the first radio frequency spectrum band and for selecting a second transmission power level in the second radio frequency spectrum band, wherein the first transmission power level and the second transmission power level satisfy the uplink transmission power criterion; and monitoring for the first uplink message via the first radio frequency spectrum band communicated at the first transmission power level, or the second uplink message via the second radio frequency spectrum band communicated at the second transmission power level, or both.

Aspect 20: The method of aspect 19, wherein transmitting the control message comprises: transmitting the control message via downlink control information, a medium access control (MAC) control element (CE), RRC signaling, or any combination thereof.

Aspect 21: The method of any of aspects 19 through 20, further comprising: transmitting control signaling indicating a power scaling ratio for the UE to perform power scaling between a first transmission power sum for the first radio frequency spectrum band and a second transmission power sum for the second radio frequency spectrum band, wherein a first transmission power limit and a second transmission power limit are based at least in part on the power scaling ratio.

Aspect 22: The method of aspect 21, wherein the power scaling ratio indicates equal power scaling between the first transmission power sum for the first radio frequency spectrum band and the second transmission power sum for the second radio frequency spectrum band.

Aspect 23: The method of any of aspects 19 through 22, further comprising: transmitting, to the UE, the control message that schedules uplink transmission of a third uplink message via a third radio frequency spectrum band, wherein the first transmission power level, the second transmission power level, and a third transmission power level for transmission via the third radio frequency spectrum band satisfy the uplink transmission power criterion; and monitoring for the third uplink message via the third radio frequency spectrum band.

Aspect 24: The method of any of aspects 19 through 23, wherein transmitting the control message further comprises: transmitting, to the UE, the control message that schedules uplink transmission in a subset of a plurality of radio frequency spectrum bands, wherein transmission power levels of the UE for the subset of the plurality of radio frequency spectrum bands satisfy the uplink transmission power criterion.

Aspect 25: The method of any of aspects 19 through 24, wherein the first radio frequency spectrum band and the second radio frequency spectrum band are configured for a carrier aggregation configuration or a dual connectivity configuration, or both.

Aspect 26: The method of any of aspects 19 through 25, wherein the uplink transmission power criterion corresponds to a specific absorption rate.

Aspect 27: An apparatus for wireless communications at a UE, comprising a processor; memory coupled with the processor; and instructions stored in the memory and executable by the processor to cause the apparatus to perform a method of any of aspects 1 through 18.

Aspect 28: An apparatus for wireless communications at a UE, comprising at least one means for performing a method of any of aspects 1 through 18.

Aspect 29: A non-transitory computer-readable medium storing code for wireless communications at a UE, the code comprising instructions executable by a processor to perform a method of any of aspects 1 through 18.

Aspect 30: An apparatus for wireless communications at a base station, comprising a processor; memory coupled with the processor; and instructions stored in the memory and executable by the processor to cause the apparatus to perform a method of any of aspects 19 through 26.

Aspect 31: An apparatus for wireless communications at a base station, comprising at least one means for performing a method of any of aspects 19 through 26.

Aspect 32: A non-transitory computer-readable medium storing code for wireless communications at a base station, the code comprising instructions executable by a processor to perform a method of any of aspects 19 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving, from a base station, control signaling that schedules uplink transmission of a first uplink message via a first radio frequency spectrum band and a second uplink message via a second radio frequency spectrum band;
    selecting, to satisfy an uplink transmission power criterion, a first transmission power level for transmission via the first radio frequency spectrum band and a second transmission power level for transmission via the second radio frequency spectrum band based at least in part on a function of UE transmission power over a preceding time interval; and
    transmitting the first uplink message via the first radio frequency spectrum band at the first transmission power level, or the second uplink message via the second radio frequency spectrum band at the second transmission power level, or both.

2. The method of claim 1, wherein the selecting comprises:
    selecting the first transmission power level based at least in part on the first radio frequency spectrum band having a higher priority than the second radio frequency spectrum band; and
    selecting the second transmission power level based at least in part on the first transmission power level, wherein a sum of the first transmission power level and the second transmission power level satisfies the uplink transmission power criterion.

3. The method of claim 1, wherein
    the uplink transmission power criterion is a threshold statistical transmission power permitted over the preceding time interval; and the preceding time interval corresponds to a symbol period, a transmission occasion within a slot, or a transmission occasion over a plurality of slots.

4. The method of claim 1, wherein the first transmission power level is selected to satisfy a first transmission power limit for the first radio frequency spectrum band and the second transmission power level is selected to satisfy a second transmission power limit for the second radio frequency spectrum band.

5. The method of claim 4, wherein the first transmission power limit is determined prior to the second transmission power limit based at least in part on the first radio frequency spectrum band having a higher priority than the second radio frequency spectrum band.

6. The method of claim 5, wherein the first radio frequency spectrum band has the higher priority based at least in part on carrier frequencies, bandwidths, subcarrier spacing configurations, cyclic prefix configurations, power classes, or any combination thereof, of at least a first uplink carriers in the first radio frequency spectrum band and at least a second uplink carriers in the second radio frequency spectrum band.

7. The method of claim 5, wherein the first radio frequency spectrum band has the higher priority based at least in part on the first radio frequency spectrum band corresponding to a primary cell and the second radio frequency spectrum band not corresponding to the primary cell.

8. The method of claim 5, wherein the first radio frequency spectrum band has the higher priority based at least in part on message content priorities, channel priorities, channel types, or any combination thereof, associated with the first uplink message transmitted on at least a first uplink carriers of the first radio frequency spectrum band and the second uplink message transmitted on at least a second uplink carriers of the second radio frequency spectrum band.

9. The method of claim 4, further comprising:
    dropping transmission of the second uplink message based at least in part on setting the second transmission power limit for the second radio frequency spectrum band to zero.

10. The method of claim 4, further comprising:
    receiving control signaling indicating a power scaling ratio for performing power scaling between a first transmission power sum for the first radio frequency spectrum band and a second transmission power sum for the second radio frequency spectrum band, wherein the first transmission power limit and the second transmission power limit are based at least in part on the power scaling ratio.

11. The method of claim 10, wherein the power scaling ratio indicates equal power scaling between the first transmission power sum for the first radio frequency spectrum band and the second transmission power sum for the second radio frequency spectrum band.

12. The method of claim 1, further comprising:
    receiving, from the base station, an indication of a duration of the preceding time interval via downlink control information, a medium access control (MAC) control element (CE), radio resource control (RRC) signaling, or any combination thereof.

13. The method of claim 1, further comprising:
    receiving control signaling indicating a first transmission power limit for the first radio frequency spectrum band and a second transmission power limit for the second radio frequency spectrum band.

14. The method of claim 13, wherein the transmitting comprises:

transmitting the first uplink message at the first transmission power level that satisfies the first transmission power limit and the second uplink message at the second transmission power level that satisfies the second transmission power limit, wherein the first transmission power level and the second transmission power level satisfy the uplink transmission power criterion.

15. The method of claim 1, further comprising:
receiving, from the base station, the control signaling that schedules uplink transmission of a third uplink message via a third radio frequency spectrum band;
selecting, to satisfy the uplink transmission power criterion, a third transmission power level for transmission via the third radio frequency spectrum band based at least in part on the function of the UE transmission power over the preceding time interval, wherein the first transmission power level, the second transmission power level, and the third transmission power level satisfy the uplink transmission power criterion; and
transmitting the third uplink message via the third radio frequency spectrum band at the third transmission power level.

16. The method of claim 1, wherein receiving the control signaling further comprises:
receiving, from the base station, the control signaling that schedules uplink transmission in a subset of a plurality of radio frequency spectrum bands, wherein transmission power levels of the UE for the subset of the plurality of radio frequency spectrum bands satisfy the uplink transmission power criterion.

17. The method of claim 1, wherein the first radio frequency spectrum band and the second radio frequency spectrum band are configured for a carrier aggregation configuration or a dual connectivity configuration, or both.

18. The method of claim 1, wherein the uplink transmission power criterion corresponds to a specific absorption rate.

19. A method for wireless communications at a base station, comprising:
transmitting, to a user equipment (UE), control signaling that schedules uplink transmission of a first uplink message via a first radio frequency spectrum band and a second uplink message via a second radio frequency spectrum band;
transmitting a control message indicating a duration of a time interval corresponding to an uplink transmission power criterion for selecting a first transmission power level in the first radio frequency spectrum band and for selecting a second transmission power level in the second radio frequency spectrum band, wherein the first transmission power level and the second transmission power level satisfy the uplink transmission power criterion; and
monitoring for the first uplink message via the first radio frequency spectrum band communicated at the first transmission power level, or the second uplink message via the second radio frequency spectrum band communicated at the second transmission power level, or both.

20. The method of claim 19, wherein transmitting the control message comprises:
transmitting the control message via downlink control information, a medium access control (MAC) control element (CE), radio resource control (RRC) signaling, or any combination thereof.

21. The method of claim 19, further comprising:
transmitting control signaling indicating a power scaling ratio for the UE to perform power scaling between a first transmission power sum for the first radio frequency spectrum band and a second transmission power sum for the second radio frequency spectrum band, wherein a first transmission power limit and a second transmission power limit are based at least in part on the power scaling ratio.

22. The method of claim 21, wherein the power scaling ratio indicates equal power scaling between the first transmission power sum for the first radio frequency spectrum band and the second transmission power sum for the second radio frequency spectrum band.

23. The method of claim 19, further comprising:
transmitting, to the UE, the control message that schedules uplink transmission of a third uplink message via a third radio frequency spectrum band, wherein the first transmission power level, the second transmission power level, and a third transmission power level for transmission via the third radio frequency spectrum band satisfy the uplink transmission power criterion; and
monitoring for the third uplink message via the third radio frequency spectrum band.

24. The method of claim 19, wherein transmitting the control message further comprises:
transmitting, to the UE, the control message that schedules uplink transmission in a subset of a plurality of radio frequency spectrum bands, wherein transmission power levels of the UE for the subset of the plurality of radio frequency spectrum bands satisfy the uplink transmission power criterion.

25. The method of claim 19, wherein the first radio frequency spectrum band and the second radio frequency spectrum band are configured for a carrier aggregation configuration or a dual connectivity configuration, or both.

26. The method of claim 19, wherein the uplink transmission power criterion corresponds to a specific absorption rate.

27. An apparatus for wireless communications at a user equipment (UE), comprising:
a processor;
memory coupled with the processor; and
instructions stored in the memory and executable by the processor to cause the apparatus to:
receive, from a base station, control signaling that schedules uplink transmission of a first uplink message via a first radio frequency spectrum band and a second uplink message via a second radio frequency spectrum band;
select, to satisfy an uplink transmission power criterion, a first transmission power level for transmission via the first radio frequency spectrum band and a second transmission power level for transmission via the second radio frequency spectrum band based at least in part on a function of UE transmission power over a preceding time interval; and
transmit the first uplink message via the first radio frequency spectrum band at the first transmission power level, or the second uplink message via the second radio frequency spectrum band at the second transmission power level, or both.

28. The apparatus of claim 27, wherein the instructions to select are executable by the processor to cause the apparatus to:
select the first transmission power level based at least in part on the first radio frequency spectrum band having a higher priority than the second radio frequency spectrum band; and select the second transmission power level based at least in part on the first transmission power level, wherein a sum of the first transmission power level and the second transmission power level satisfies the uplink transmission power criterion.

29. The apparatus of claim 27, wherein the first transmission power level is selected to satisfy a first transmission power limit for the first radio frequency spectrum band and the second transmission power level is selected to satisfy a second transmission power limit for the second radio frequency spectrum band.

30. An apparatus for wireless communications at a base station, comprising:
a processor;
memory coupled with the processor; and
instructions stored in the memory and executable by the processor to cause the apparatus to:
transmit, to a user equipment (UE), control signaling that schedules uplink transmission of a first uplink message via a first radio frequency spectrum band and a second uplink message via a second radio frequency spectrum band;
transmit a control message indicating a duration of a time interval corresponding to an uplink transmission power criterion for selecting a first transmission power level in the first radio frequency spectrum band and for selecting a second transmission power level in the second radio frequency spectrum band, wherein the first transmission power level and the second transmission power level satisfy the uplink transmission power criterion; and
monitor for the first uplink message via the first radio frequency spectrum band communicated at the first transmission power level, or the second uplink message via the second radio frequency spectrum band communicated at the second transmission power level, or both.

* * * * *